United States Patent
Kane et al.

(10) Patent No.: US 10,944,662 B2
(45) Date of Patent: Mar. 9, 2021

(54) BYPASS DETECTION ANALYSIS OF NETWORK TRAFFIC TO DETERMINE TRANSCEIVING OF NETWORK TRAFFIC VIA PEER NETWORKS

(71) Applicant: LEVEL 3 COMMUNICATIONS, LLC, Broomfield, CO (US)

(72) Inventors: John Kane, Longmont, CO (US); Joseph Lawrence, Boulder, CO (US); Maria Farnon, Denver, CO (US); Rick Nooner, Broomfield, CO (US); Raoul Alcala, Superior, CO (US); Mark Taylor, Boulder, CO (US)

(73) Assignee: LEVEL 3 COMMUNICATIONS, LLC, Broomfield, CO (US)

( * ) Notice: Subject to any disclaimer, the term of this patent is extended or adjusted under 35 U.S.C. 154(b) by 0 days.

(21) Appl. No.: 16/591,063

(22) Filed: Oct. 2, 2019

(65) Prior Publication Data

US 2020/0036616 A1 Jan. 30, 2020

Related U.S. Application Data

(60) Division of application No. 14/486,957, filed on Sep. 15, 2014, now Pat. No. 10,574,557, which is a
(Continued)

(51) Int. Cl.
*H04L 12/26* (2006.01)
*H04L 12/24* (2006.01)
(Continued)

(52) U.S. Cl.
CPC ...... *H04L 43/0894* (2013.01); *H04L 41/0213* (2013.01); *H04L 41/145* (2013.01);
(Continued)

(58) Field of Classification Search
CPC ............. H04L 43/0894; H04L 41/0213; H04L 41/145; H04L 43/045; H04L 45/04; H04L 67/36

See application file for complete search history.

(56) References Cited

U.S. PATENT DOCUMENTS 5,933,422 A 8/1999 Kusano
6,052,736 A 4/2000 Ogle
(Continued)

FOREIGN PATENT DOCUMENTS

EP 1976183 A2 10/2008
JP 2005311458 11/2005
(Continued)

OTHER PUBLICATIONS

Canadian Examination Report, dated Jan. 24, 2014, Application No. 2,751,211, filed Feb. 1, 2010; 8 pgs.
(Continued)

*Primary Examiner* — Viet D Vu

(57) ABSTRACT

Embodiments generally disclosed herein include a computer-implemented method for monitoring and correlating network traffic data associated with a primary network that is in communication with a plurality of secondary networks. The method generates a network traffic data set by monitoring network traffic between the primary network and the plurality of secondary networks. The method also determines a mapping of network connectivity by monitoring inter-network routing information between the primary network and the plurality of secondary networks. In addition, the method generates a traffic measurement data set by monitoring network utilization statistics between the primary network and the plurality of secondary networks. With the collected data sets, the method then calculates a relational network mapping between the primary network and the plurality of secondary networks by correlating the net-
(Continued)

work traffic data set, the mapping of network connectivity, and the traffic measurement data set.

10 Claims, 14 Drawing Sheets

Related U.S. Application Data continuation of application No. 12/698,004, filed on Feb. 1, 2010, now Pat. No. 8,838,780.

(60) Provisional application No. 61/149,130, filed on Feb. 2, 2009.

(51) Int. Cl.
*H04L 12/715* (2013.01)
*H04L 29/08* (2006.01)

(52) U.S. Cl.
CPC ............ *H04L 43/045* (2013.01); *H04L 45/04* (2013.01); *H04L 67/36* (2013.01)

(56) References Cited

U.S. PATENT DOCUMENTS

| | | | |
|---|---|---|---|
| 6,178,459 B1 | 1/2001 | Sugiyama | |
| 6,216,117 B1 | 4/2001 | Hall | |
| 6,333,918 B1 * | 12/2001 | Hummel | H04L 45/04 370/238 |
| 6,603,769 B1 | 8/2003 | Thubert | |
| 6,744,727 B2 | 6/2004 | Liu et al. | |
| 6,795,399 B1 | 9/2004 | Benmohamed | |
| 6,907,000 B1 | 6/2005 | Host | |
| 7,069,177 B2 | 6/2006 | Carley | |
| 7,225,249 B1 | 5/2007 | Barry | |
| 7,319,673 B1 | 1/2008 | Briscoe | |
| 7,664,789 B2 | 2/2010 | Mirtorabi | |
| 7,818,565 B2 | 10/2010 | Miller | |
| 8,073,777 B2 | 12/2011 | Barry | |
| 8,422,362 B2 * | 4/2013 | Wang | H04L 45/04 370/225 |
| 8,452,894 B2 | 5/2013 | Alonso Alarcon | |
| 2002/0004843 A1 | 1/2002 | Andersson | |
| 2002/0138645 A1 | 9/2002 | Shinomiya | |
| 2002/0141342 A1 | 10/2002 | Furman et al. | |
| 2003/0005145 A1 | 1/2003 | Bullard | |
| 2003/0041167 A1 | 2/2003 | French | |
| 2003/0105976 A1 | 6/2003 | Copeland | |
| 2003/0204619 A1 | 10/2003 | Bays | |
| 2004/0083277 A1 | 4/2004 | Chaporkar et al. | |
| 2004/0179546 A1 | 9/2004 | McDaniel et al. | |
| 2005/0063321 A1 | 3/2005 | Imai | |
| 2005/0172018 A1 | 8/2005 | Devine | |
| 2005/0197993 A1 | 9/2005 | Korotky | |
| 2005/0201302 A1 | 9/2005 | Gaddis et al. | |
| 2005/0216421 A1 | 9/2005 | Barry | |
| 2005/0232230 A1 | 10/2005 | Nagami et al. | |
| 2006/0235962 A1 | 10/2006 | Vinberg | |
| 2007/0094062 A1 | 4/2007 | Tracy et al. | |
| 2007/0124465 A1 | 5/2007 | Malloy et al. | |
| 2008/0056137 A1 * | 3/2008 | Ravindran | H04L 45/28 370/238 |
| 2008/0062891 A1 | 3/2008 | Van der Merwe | |
| 2008/0259820 A1 * | 10/2008 | White | H04L 45/02 370/255 |
| 2009/0103490 A1 * | 4/2009 | Lakshmikanthan | H04L 12/4633 370/331 |
| 2009/0238074 A1 | 9/2009 | Vasseur | |
| 2010/0195516 A1 | 8/2010 | McReynolds et al. | |
| 2010/0281388 A1 | 11/2010 | Kane et al. | |
| 2012/0089993 A1 | 4/2012 | Alonso Alarcon | |
| 2014/0010104 A1 | 1/2014 | McReynolds et al. | |
| 2015/0039755 A1 | 2/2015 | Kane et al. | |
| 2016/0014003 A1 | 1/2016 | McReynolds et al. | |

FOREIGN PATENT DOCUMENTS

| | | |
|---|---|---|
| JP | 2007243487 | 9/2007 |
| WO | WO-200223807 A2 | 3/2002 |
| WO | WO-2007148311 A2 | 12/2007 |

OTHER PUBLICATIONS

Canadian Examination Report, dated Sep. 23, 2013, Application No. 2,751,214, filed Feb. 1, 2010; 3 pgs.
Chinese Examination Report, dated Jun. 27, 2014, Application No. 201080014371.5, filed Feb. 1, 2010; 8 pgs.
Chinese Examination Report, dated Nov. 2, 2013, Application No. 201080014371.5, filed Feb. 1, 2010; 9 pgs.
Chinese Examination Report, dated Sep. 12, 2013, Application No. 201080015073.8, filed Feb. 1, 2010;11 pgs.
European Examination Report, dated Apr. 6, 2016, Application No. 10736515.7, filed Feb. 1, 2010; 4 pgs.
Extended European Search Report, dated Jul. 28, 2014, Application No. 10736515.7, filed Feb. 1, 2010; 11 pgs.
Extended European Search Report, dated Mar. 16, 2015, Application No. 10736538.9, filed Feb. 1, 2010; 6 pgs.
International Search Report from WIPO, International Application No. PCT/US2010/022768, International Filing Date Feb. 1, 2010, ISR dated Mar. 30, 2010 , 3 pgs.
International Search Report, dated Apr. 8, 2010, Int'l Appl. No. PCT/US10/022714, Int'l Filing Date Feb. 1, 2010; 3 pgs.
Japanese Examination Report, dated Jan. 22, 2013, Application No. 2011-548376, 2 pgs.
Japanese Examination Report, dated Mar. 19, 2013, Application No. 2011-548367, 4 pgs.
Korean Examination Report, dated Nov. 19, 2012, Application No. 2011-7020385, 6 pgs.
Written Opinion, International Application No. PCT/US2010/ 022768, International Filing Date Feb. 1, 2010, Written Opinion, dated Mar. 30, 2010 , 10 pgs.
Andreozzi, Sergio et al., *Future Generation Computer Systems* vol. 21, No. 4; Elsevier Science Publishers, Amsterdam, NL; XP027777944 Apr. 1, 2005 00:00:00.0 , pp. 559-571.

* cited by examiner

SENT FROM CUSTOMER 1
REGION 1

RECEIVED BY CUSTOMER 1
REGION 2

REGION PARAMETER
(E.G., US, EUROPE, ETC.)

SENT FROM CUSTOMER 1
ON-NET

RECEIVED BY CUSTOMER 1
OFF-NET

TRAFFIC TYPE PARAMETER
(E.G., ON-NET, OFF-NET, ETC.)

SENT FROM CUSTOMER 1
BACKBONE

RECEIVED BY CUSTOMER 1
LOCAL

TRANSMISSION PARAMETER
(E.G., BACKBONE, LOCAL, ETC.)

BYPASS DETECTION ANALYSIS OF NETWORK TRAFFIC TO DETERMINE TRANSCEIVING OF NETWORK TRAFFIC VIA PEER NETWORKS

RELATED APPLICATIONS

This application is a divisional of and claims the benefit of priority to U.S. application Ser. No. 14/486,957, filed Sep. 15, 2014, entitled "Analysis of Network Traffic," issued as U.S. Pat. No. 10,574,557, which is incorporated by reference in its entirety for all purposes. application Ser. No. 14/486,957 is a continuation of and claims the benefit of priority to commonly owned U.S. application Ser. No. 12/698,004, filed Feb. 1, 2010, entitled "Analysis of Network Traffic," issued as U.S. Pat. No. 8,838,780, which is incorporated by reference in its entirety for all purposes. application Ser. No. 12/698,004 claims the benefit of priority to commonly owned U.S. Provisional Application No. 61/149,130, filed Feb. 2, 2009, entitled "Analysis of Network Traffic," which is incorporated by reference in its entirety for all purposes.

TECHNICAL FIELD

Embodiments presently disclosed generally relate to network communications. More specifically, embodiments herein relate to monitoring and correlating network traffic data associated with a primary network that is in communication with a one or more secondary networks.

BACKGROUND OF THE INVENTION

Networks such as autonomous systems (ASs) are complex systems of devices (e.g., routers, switches, gateways, etc.) and various routing protocols that require constant monitoring and management to ensure efficient performance for its users. Operators of networks often use conventional techniques for monitoring and managing these complex systems. One such conventional technique is made possible by use of the Simple Network Management Protocol (SNMP).

For example, SNMP processes, or agents, run on network devices (e.g., routers, switches, etc.) and monitor network traffic information such as octet strings, network addresses (e.g., Internet Protocol "IP" addresses), object identifiers, and the like. The agent processes periodically report the monitored network traffic information back to one or more central or managing network devices via SNMP. There, the managing network devices can aggregate and process network traffic information from several agent processes that gather and report network data from around the network.

SUMMARY OF THE INVENTION

Embodiments generally disclosed herein include a computer-implemented method and system for monitoring and correlating network traffic data associated with a primary network that is in communication with a plurality of secondary networks. The method comprises a network correlator capable of generating a network traffic data set by monitoring network traffic between the primary network and a plurality of secondary networks (e.g., customer and peer networks). The network correlator can further determine a mapping of network connectivity by monitoring inter-network routing information between the primary network and the plurality of secondary networks. In addition, the network correlator can generate a traffic measurement data set by monitoring network utilization statistics between the primary network and plurality of secondary networks.

With this information, the network correlator is capable of calculating a relational network mapping between the primary network and plurality of secondary networks by correlating the network traffic data set, the mapping of network connectivity and the traffic measurement data set. The relational network mapping may be displayed on a graphical user interface in accordance with various configurable parameters.

BRIEF DESCRIPTION OF DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

Throughout the drawing figures, like reference numerals will be understood to refer to like parts and components.

DETAILED DESCRIPTION

Embodiments disclosed herein provide for improved methods and systems for monitoring and processing raw network data and creating an analytical framework for evaluating network traffic statistics and behavior. Such improvements will become apparent in the discussion of the embodiments and related figures below.

Figure 1:
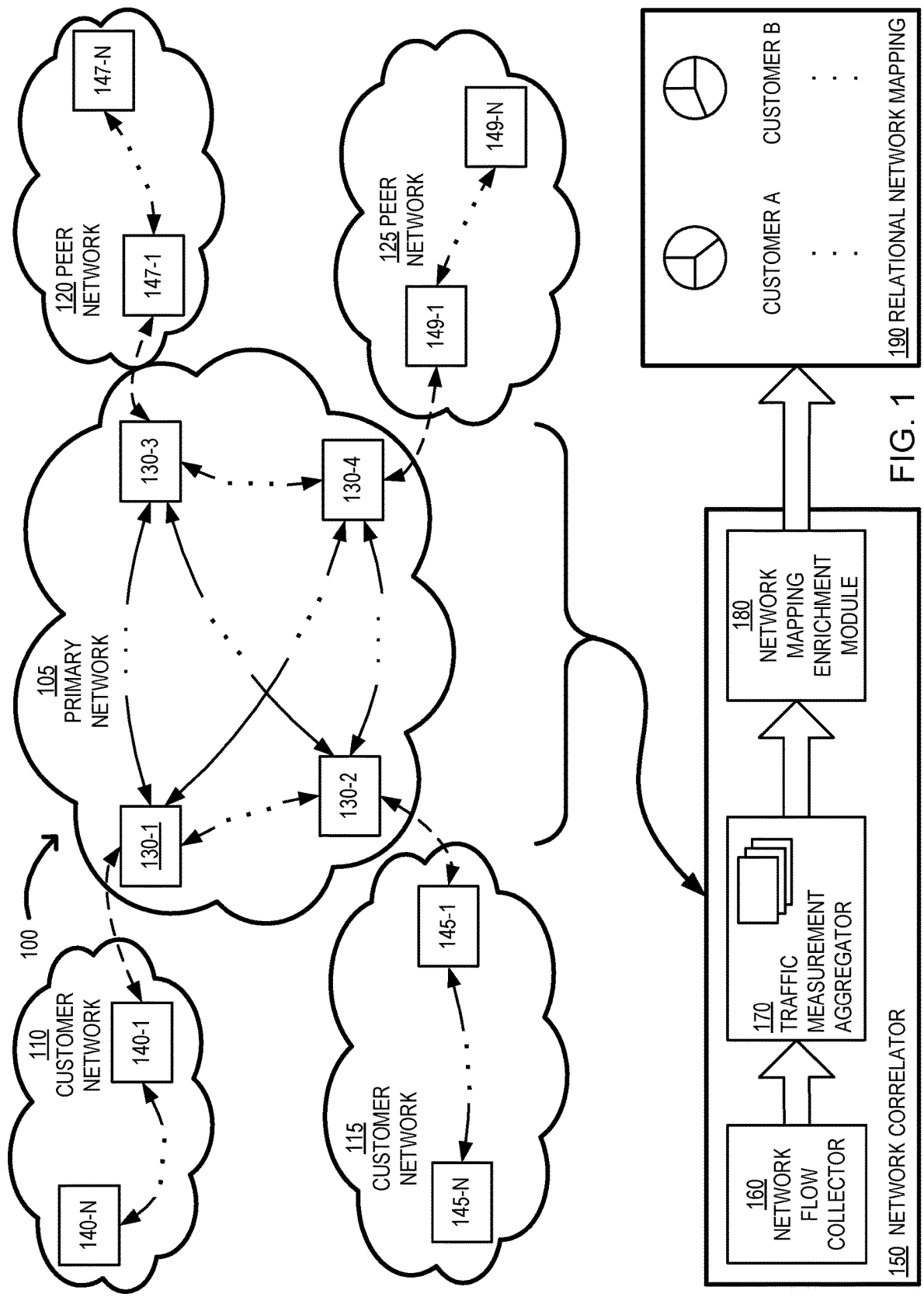
FIG. 1 is a block diagram of a network environment for monitoring and correlating network traffic data in accordance with an example embodiment.

FIG. 1 is a block diagram of a network environment 100 including a primary network 105 and multiple secondary networks. The secondary networks include customer network 110, customer network 115, peer network 120, and peer network 125. Network correlator 150 includes network flow collector module 160, traffic measurement aggregator module 170, and network mapping enrichment module 180. Relational network mapping 190 is generated by network correlator 150. Note that a module may be implemented as hardware, software, or a combination of both hardware and software.

Primary network 105 includes multiple ingress/egress routers in communication with the various secondary networks. For example, edge router 130-1 of primary network 105 interfaces with edge router 140-1 of customer network 110, edge router 130-2 of primary network 105 interfaces with edge router 145-1 of customer network 115, edge router 130-3 of primary network 105 interfaces with edge router 147-1 of peer network 120, and edge router 130-4 of primary network 105 interfaces with edge router 149-1 of peer network 125. Note that edge routers 130-1, 130-2, 130-3, and 130-4 can communicate with one another across primary network 105 over multiple iterations and hops of others routers contained within the primary network as indicated by the ellipses in the double arrowed lines.

Note that edge router 140-1 in customer network 110 can communicate with router 140-N via one or more router hops, wherein router 140-N may interface with another network, gateway, end user, etc. Similarly, edge router 145-1 in customer network 115 can communicate with router 145-N via one or more router hops, wherein router 145-N may interface with another network, gateway, end user, etc. Edge router 147-1 in peer network 120 can communicate with router 147-N via one or more router hops, wherein router 147-N may interface with another network, gateway, end user, etc. Additionally, edge router 149-1 in peer network 125 can communicate with router 149-N via one or more router hops, wherein router 149-N may interface with another network, gateway, end user, etc.

Although only two customer networks and two peer networks are shown in the example embodiment of FIG. 1, more (or fewer) customer and/or peer networks may directly interface with the primary network 105 for purposes of describing the disclosed embodiments.

During general operation, the network correlator 150 monitors and gathers information from the primary network's 105 interaction with the secondary networks. Each module of the network correlator 150 monitors and collects various network data and statistics in order for the network correlator 150 to generate the relational network mapping 190. The relational network mapping 190 can then be represented in a configurable graphical interface for a user (e.g., network operator) to evaluate network behavior and traffic patterns of the primary network 105 with respect to network traffic transceived between (i.e., sent to and received by) the secondary networks. With its robust configurability and integration of rich network data, the relational network mapping 190 can provide valuable insight into previously unrealized business opportunities and network operating strategies. These advantages will become apparent during the discussion of the embodiments and related figures below.

In embodiments disclosed herein, it should be noted that the network correlator 150 (and related modules) can, for example, generate the relational network mapping 190 with network data and statistics supplied only by the primary network 105—although not required for implementation of network correlator 150. In other words, the network correlator 150 need not directly receive or extract network data from other networks (i.e., secondary networks) to generate the relational network mapping 190.

It should also be noted that, although shown as part of the network correlator 150, each module (i.e., network flow collector 160, traffic measurement aggregator module 170, and network mapping enrichment module 180) can operate independently of the network correlator 150 as a different process executing on the same or separate devices (e.g., routers, servers, PCs, etc.). The modules in FIG. 1 are shown as part of the network correlator 150 module/process for purposes of example only.

Note that the primary network is designated as "primary" since it is the network being analyzed by the network correlator. Any other network for that matter may also be scrutinized by the network correlator to provide similar statistical and behavioral analysis (e.g., relational network mapping) in accordance with embodiments disclosed herein.

Figure 2:
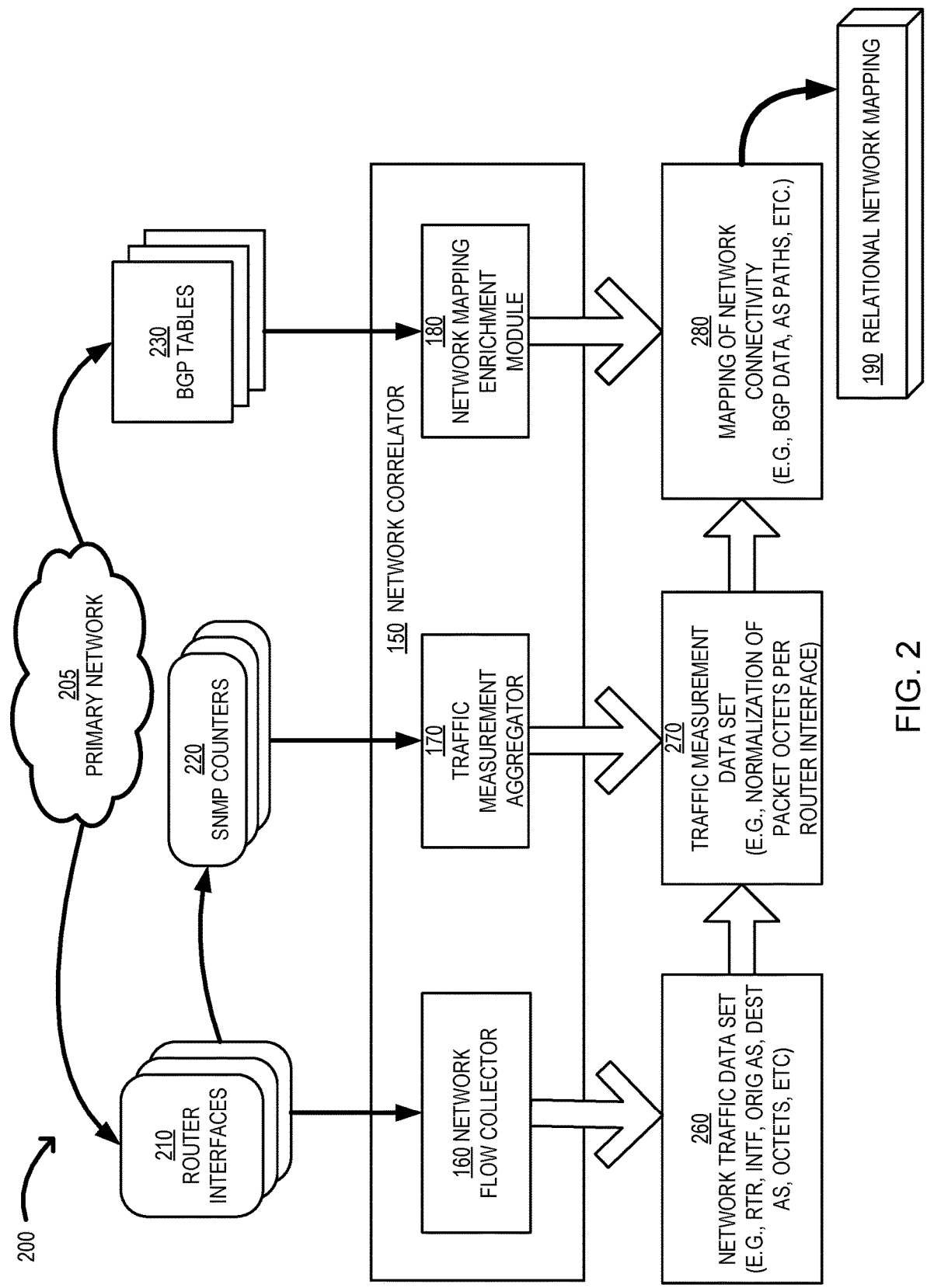
FIG. 2 is a block diagram of a network configuration for monitoring and correlator network traffic data in accordance with an example embodiment.

FIG. 2 is a block diagram of a network processing environment 200 including a primary network 205 and network correlator 150. The primary network supplies information to the network correlator 150 by way of router interfaces 210, Simple Network Management Protocol (SNMP) counters 220, and Border Gateway Protocol (BGP) tables 230. Similar to FIG. 1, network correlator 150 includes network flow collector module 160, traffic measurement aggregator module 170, and network mapping enrichment module 180. The network flow collector module 160 provides a network traffic data set 260, the traffic measurement aggregator module provides a traffic measurement data set 270, and the network mapping enrichment module 180 provides a mapping of network connectivity 280.

During general operation, the network correlator 150 processes and correlates the network traffic data set 260, traffic measurement data set 270, and mapping of network connectivity 280 to generate the relational network mapping 190. Stated differently, the network correlator 150 is said to enrich the network traffic data set 260 with the traffic measurement data set 270 and mapping of network connectivity 280 in order to create the relational network mapping 190, according to an example embodiment.

Generally, the network flow collector module 160 collects network data and statistics to provide information (via network traffic data set 260) related to the identity of who sends and receives network traffic at a particular router interface 210 (e.g., ingress router) in the primary network 205. In particular, this information can include, for example, a router identifier, an interface identifier for that particular router (assuming multiple network interfaces per router), an origin Autonomous System (AS) number, a destination AS number, etc. Such information can also include an estimation or approximation of the amount or rate of traffic transceived at that particular ingress interface.

In the same vein, the traffic measurement aggregator module 170 collects network data and statistics to provide information (via traffic measurement data set 270) related to an amount (or rate) of data transceived at a particular router interface 210 of the primary network 205. This measurement of the amount (or rate) of network traffic made by the traffic measurement aggregator module 170 is much more accurate than the traffic measurement provided by the network flow collector module 160. However, the traffic measurement aggregator module 170 does not know from where the network traffic was received, or to where the network traffic was sent, at the router interface 210. In other words, the traffic measurement aggregator module 170 determines an amount (or rate) of network traffic sent to or received at an ingress router interface 210, but generally does not know who sent or who received this network traffic.

For example, assume that the network flow collector module 160 detects, during a given time period, that a particular router interface 210 receives about 3 megabits per second (Mbps) of network traffic from customer network A that is being transmitted to customer network B. Further assume that the network flow collector module 160 detects that the particular router interface 210 receives about 6 Mbps of network traffic from customer A that is being transmitted to customer C, as well as an additional 9 Mbps of network received that is being transmitted to customer D. In total, the network flow collector module 160 detects approximately 18 Mbps of network traffic received from customer A (and intended for customers B, C and D) at the particular router interface 210 during the given time period. This information is reflected in the network traffic data set 260.

Next, assume that the traffic measurement aggregator module 170 detects, for the given time period, that the particular router interface 210 receives a total of 24 Mbps of network traffic from customer A—although not knowing to where the 24 Mbps of network traffic is sent. This information is reflected in the traffic measurement data set 270 (e.g., router interface 210 received network traffic at a rate of 24 Mbps from customer A during a 5 minute sampling interval).

In continuing with the above example, the network correlator 150 would process and correlate the network traffic data set 260 and traffic measurement data set 270 to yield a more accurate (and normalized) representation of network traffic received at the particular router interface 210 during the given time period. As such, the traffic measurement data set 270 normalizes the traffic measurements made by the network flow collector module 160 over the given time period (e.g., 5 minutes) to provide a more precise measurement and assessment of network traffic flow associated with the particular router interface 210. For this example, the network traffic from customer A being sent to customer B would be normalized to 4 Mbps, the network traffic from customer A being sent to for customer C would be normalized to 8 Mbps, and the network traffic from customer A being sent to customer D would be normalized to 12 Mbps—thus yielding a total of 24 Mbps, the same amount/rate of network traffic detected by the traffic measurement aggregator module 170 as represented in the traffic measurement data set 270. Note that this is only one example aspect of how the network correlator 150 processes data and does not yet include further enrichment techniques using the mapping of network connectivity 280, as will be discussed further below.

According to another example embodiment, the traffic measurement aggregator module 170 monitors and collects network traffic amounts and rates using SNMP counters 220 and SNMP messaging. The SNMP counters 220 typically normalize network traffic data (e.g., packet octets) in accordance with a predetermined sampling rate (e.g., 5 minutes). Normalization can be determined by measuring an amount of data transceived over a router interface 210 during a given sampling period against the associated data rate of network traffic transceived over the router interface 210 during the given sampling period. In one example embodiment, the SNMP counters 220 communicate with the network correlator 150 via SNMP messages/messaging.

Still referring to the example embodiment of FIG. 2, the network mapping enrichment module 180 monitors and collects information from BGP tables associated with the primary network's 205 connectivity relationships with its secondary networks. For example, BGP information and tables can be obtained from third party vendors that gather and distribute such collections of data. The BGP tables can include, for example, routing tables that are advertised by secondary networks. The routing tables have connectivity information (e.g., IP addresses, AS paths, etc.) that provide which destinations are reachable from a particular ingress router in a secondary network that interfaces with an egress router in the primary network 205. Furthermore, the BGP tables associated with the various secondary networks can be localized into one or more aggregated BGP tables within the primary network, thus providing a more global and complete view of the primary network's connectivity with its secondary networks. In particular, and as will be discussed in more detail below, the mapping of network connectivity 280 provides egress AS numbers associated with network traffic. With egress AS numbers, it can be determined to which secondary network (i.e., directly interfaced network) the traffic is being sent (via an egress router interface of the primary network 205).

As shown in the example embodiment of FIG. 2, the network correlator 150 processes and correlates the network traffic data set 260, the traffic measurement data set 270, and mapping of network connectivity 280 to generate the relational network mapping 190.

The network traffic data set 260, traffic measurement data set 270, and mapping of network connectivity 280 are discussed in more detail below with respect to FIG. 3.

Figure 3:
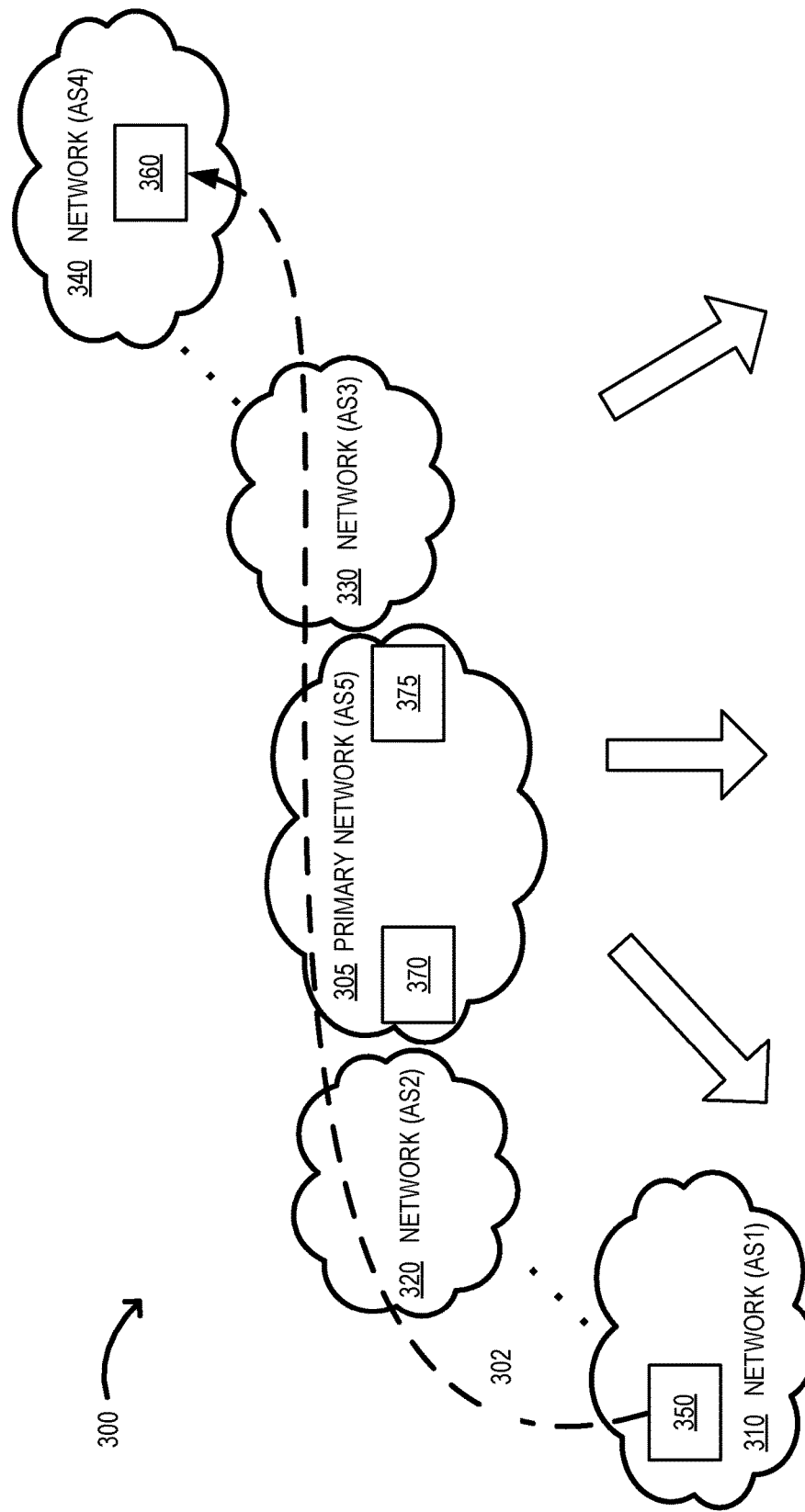
FIG. 3 is a block diagram of a network environment for monitoring and correlating network traffic data in accordance with an example embodiment.

FIG. 3 Is a block diagram of an example network configuration 300 including a primary network 305 having AS number AS5, network 310 having AS number AS1, network 320 having AS number AS2, network 330 having AS number AS3, and network 340 having AS number AS4. Note that the ellipses between network 320 and network 310, and between network 330 and network 340, indicate that one or more networks may reside between those respective networks.

The example embodiment of FIG. 3 depicts router 350 in network 310 sending network traffic (e.g., originating from a server or other end-user device) to router 360 in network 340 (as indicated by traffic traversal line 302). Note that the network traffic traverses network 320, primary network 305, and network 330 during its journey to router 360 in network 340 (e.g., so that router 360 may ultimately route the traffic to an end-user device). Further note that the network traffic sent by router 350 passes through ingress router interface 370 and egress router interface 375 of primary network 305.

Given this example data transmission 302, the network flow collector module 160 collects network data and statistics to create network traffic data set 260 having information such as, for example, origin IP address of router 350, destination IP address of router 360, origin AS of network 310 (AS1), destination AS of network 340 (AS4), ingress AS of network 320 (AS2), etc. The network traffic data set 260 can also include an approximated amount and/or rate of network traffic associated with the data transmission at the ingress router interface 370.

Furthermore, the traffic measurement aggregator module 170 collects network data and statistics to create traffic measurement data set 270. As previously discussed, the traffic measurement aggregator module 170 normalizes network traffic amounts and/or rates transceived at a particular ingress interface (e.g., ingress interface 370 in this example)

during a given sampling period. The traffic measurement data set 270 can be used to provide a more accurate representation of the amount (or rate) of data transmitted through the primary network 305.

Referring still to FIG. 3, the network mapping enrichment module 180 collects data and statistics to create the mapping of network connectivity 280. For the example data transmission between router 350 and router 360, the mapping of network connectivity 280 can include information such as, for example, AS path (e.g., AS1, . . . , AS2, AS5, AS3, . . . , AS4), egress AS of network 330 (AS3), destination AS of network 340 (AS4), etc. In one example, the egress AS of network 330 (AS3) can be ascertained by determining that network traffic passes through egress router interface 375 of the primary network 305 and, then, using this information to find an associated egress AS in a BGP table that was advertised to egress router interface 375 by network 330.

In another example embodiment, the network correlator 150 (e.g., via network flow collector module 160) can use network data (e.g., router interface identifier, AS number, etc.) to determine the "to whom" and "from whom" of a data transmission. For example, the network correlator (or other process) can perform a table lookup in a customer database using a router interface identifier (or, for example, an IP address, router device identifier, etc.) to determine from which customer network or peer network the transmission is being sent. Similarly, such network data can be used for geo-location purposes to determine a geographic location or proximity of a sender/receiver of the data transmission (e.g., associated with an origination and/or destination IP address). For example, the IP address of the sender/receiver of network traffic can be used to perform a table look-up in a database that contains geo-location information. Such information can be useful to determine more specific geographic spans of a primary network that are utilized during various data transmissions between secondary networks.

Figure 4A:
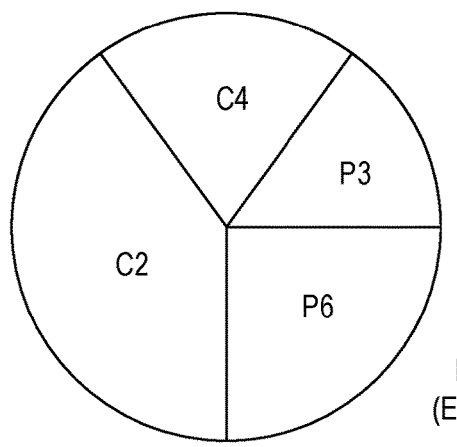
FIGS. 4A-4C are graphical representations of various relational network mapping configurations in accordance with an example embodiment.
Figure 4A:
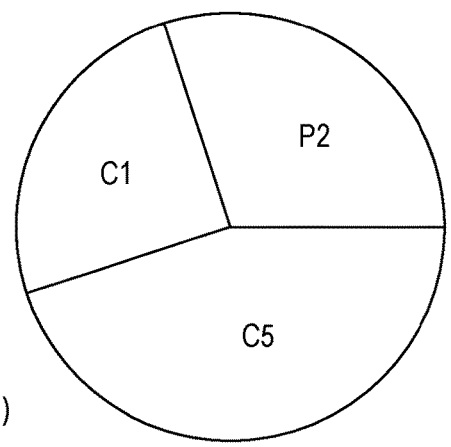
Figure 4B:
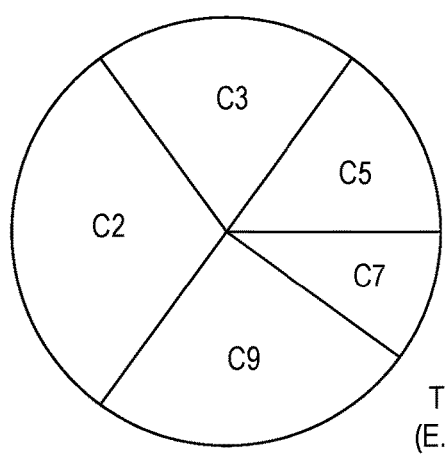
Figure 4B:
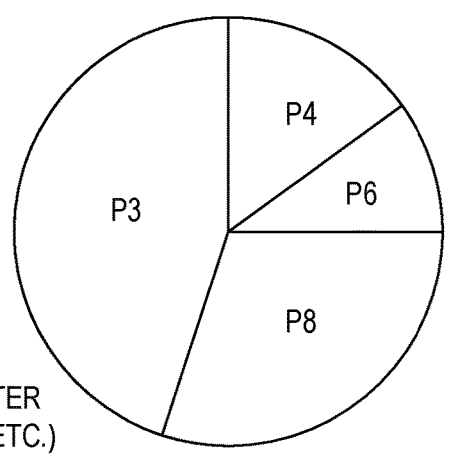
Figure 4C:
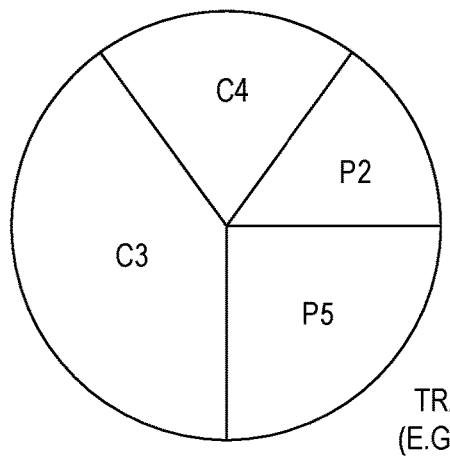
Figure 4C:
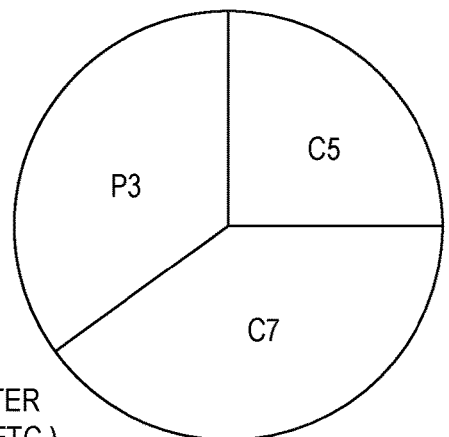

FIGS. 4A-4C depict example graphical representations of the relational network mapping 190. In one example embodiment, the network correlator 150 displays one or more of these graphical representations in a graphical user interface.

The relational network mapping 190 may be configured according to network parameters in order to show a more detailed perspective of traffic behavior in a primary network. The configurability of such parameters is made possible, at least in part, by the monitoring and correlation of the various network data and statistics provided by the modules disclosed herein.

For example, the relational network mapping 190 may be configured according to a region parameter. The region parameters can narrow the display of the network traffic to various regions supported by the network. Using such data as, for example, origination AS, destination AS, ingress AS, egress AS, etc., the relational network mapping can be selectively configured to only show network traffic transceived over a particular region (e.g., United States, Europe, East Coast, etc.).

FIG. 4A shows two example pie charts that depict a manifestation of the relational network mapping 190 as configured according to the region parameter. The pie chart on the left shows a breakdown of network traffic sent from Customer 1 over Region 1 (e.g., United States) of the primary network during a given time period (e.g., one month). That is, customer C2, customer C4, peer P3, and peer P6 each received a proportion of total network traffic from Customer 1 over Region 1 of the primary network for a given time period as represented by the proportion of each slice of the pie.

Similarly, the pie chart on the right in FIG. 4A shows an example breakdown of network traffic received by Customer 1 over Region 2 (e.g., Europe) of the primary network during a given time period (e.g., one month). That is, customer C1, customer C5, and peer P2 each sent a proportion of total network traffic to Customer 1 over Region 2 of the primary network for a given time period as represented by the proportion of each slice of the pie.

In another example embodiment, the relational network mapping 190 may be configured according to a traffic type parameter. The traffic type parameter can narrow the display of the network traffic to various traffic types supported by the network. Using such data as, for example, an ingress AS, a network interface identifier, etc., the relational network mapping 190 can be selectively configured to show network traffic transceived according to a particular traffic type (e.g., on-net, off-net, etc.). Generally, on-net is traffic that remains exclusively on the primary network or a customer network. Off-net traffic, on the other hand, is traffic that ingresses or egresses to a peer network.

FIG. 4B shows two example pie charts that depict a manifestation of the relational network mapping 190 as configured according to the traffic type parameter. The pie chart on the left shows a breakdown of on-net network traffic sent by Customer 1 over the primary network during a given time period (e.g., one week). That is, customer C2, customer C3, customer C5, customer C7, and customer C9 each received a proportion of total network traffic from Customer 1 over the primary network for a given time period as represented by the proportion of each slice of the pie. Note that since the parameter is configured as "on-net," only customer networks of the primary network are shown in the pie chart, according to this example embodiment.

Similarly, the pie chart on the right in FIG. 4B shows an example breakdown of off-net network traffic received by Customer 1 over the primary network during a given time period (e.g., one week). That is, peer P3, peer P4, peer P6, and peer P8 each sent a proportion of total network traffic to Customer 1 over the primary network for a given time period as represented by the proportion of each slice of the pie. Note that since the parameter is configured as "off-net" in FIG. 4B, only peer networks of the primary network are shown in the pie chart, according to this example embodiment.

According to another example embodiment, the relational network mapping 190 may be configured according to a transmission parameter. The transmission parameter can narrow the display of the network traffic to various transmission types supported by the network. Using such data as, for example, origination AS, destination AS, ingress AS, egress AS, etc., the relational network mapping 190 can be selectively configured to show network traffic transceived according to a transmission type (e.g., backbone, long-haul, local, etc.).

FIG. 4C shows two example pie charts that depict a manifestation of the relational network mapping 190 as configured according to the transmission parameter. The pie chart on the left shows a breakdown of network traffic sent by Customer 1 over the backbone of the primary network during a given time period (e.g., one month). That is, customer C3, customer C4, peer P2, and peer P5 each received a proportion of total network traffic from Customer 1 over the backbone of the primary network for a given time period as represented by the proportion of each slice of the pie.

Similarly, the example pie chart on the right in FIG. 4C shows a breakdown of network traffic received by Customer 1 over the local transmission portion of the primary network during a given time period (e.g., one month). That is, customer C5, customer C7, and peer P3 each sent a proportion of total network traffic to Customer 1 over the local transmission portion of the primary network for a given time period as represented by the proportion of each slice of the pie.

Note that each of the parameters (i.e., region, traffic type and transmission) may be configured simultaneously or in various combinations in order to further tailor the representation of the relational network mapping 190. Such robust configurability provides a significant improvement for analyzing network operational statistics in that a network's behavior can be evaluated from varying and unique perspectives at the same time.

For example, the relational network mapping 190 can be configured according to Region 1, On-net traffic, and Backbone traffic for network traffic transceived over the primary network by a particular customer or peer network. Furthermore, the relational network mapping 190 can be configured to show either network traffic received from or sent to a particular customer or peer network over the primary network in addition to one or more configurable combinations of the previously described parameters.

It should also be noted that the parameters (i.e., region, traffic type and transmission) described in these example embodiments do not represent an exhaustive list and, as such, other configurable parameters suitable for representing statistical data of network traffic flow and behavior may also be implemented in furtherance of configuring the relational network mapping 190.

It should be further noted that the pie charts in FIGS. 4A-4C are used for purposes of example only. Certainly, other commonly known methods for representing statistical data (e.g., line graphs, bar graphs, Venn diagrams, etc.) may be used to graphically display the relational network mapping and its various configurations, and such methods and techniques are contemplated to be within the scope of the present embodiments.

Figure 5:
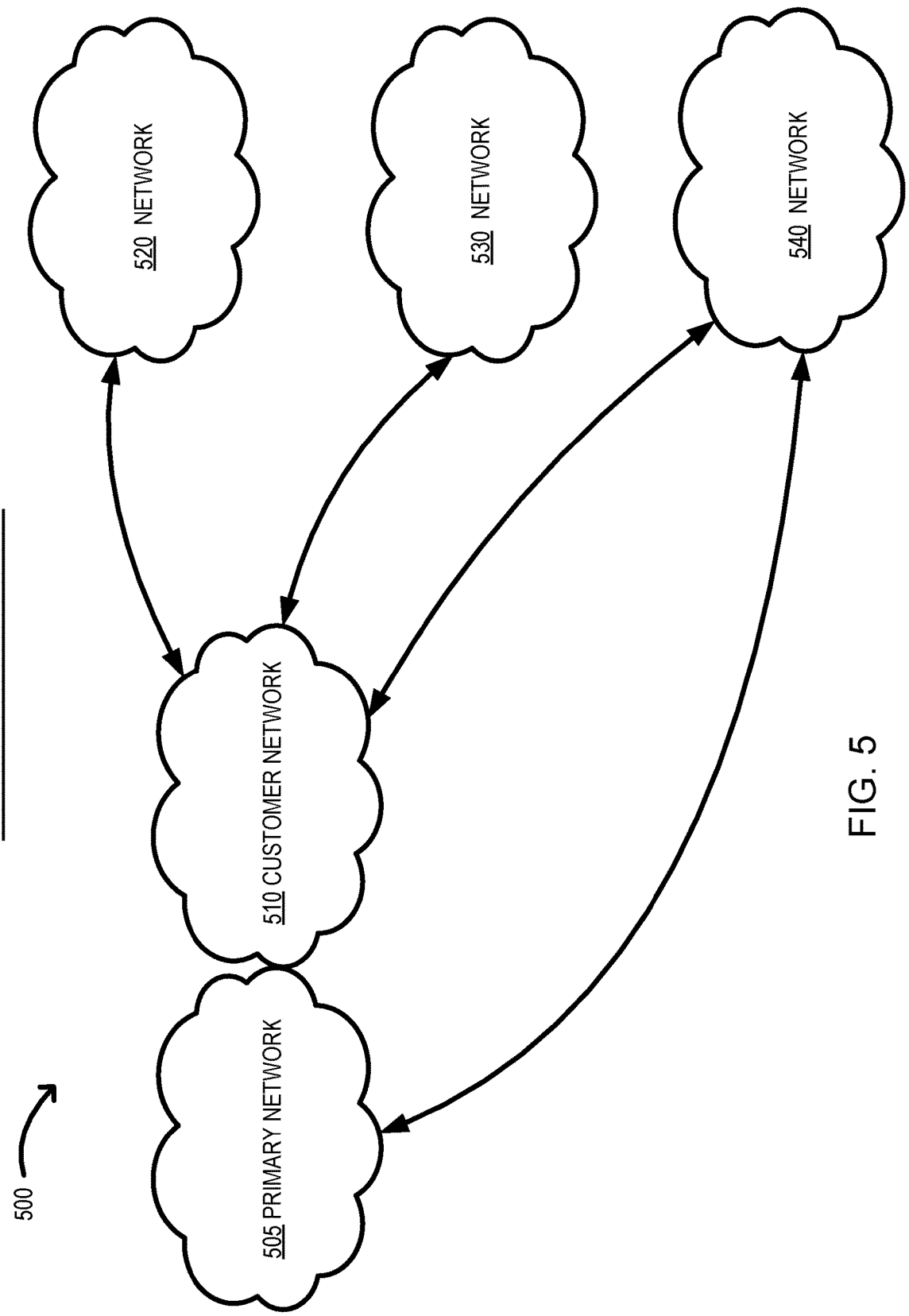
FIG. 5 is a block diagram of a network environment for performing impact analysis in accordance with an example embodiment.

FIG. 5 is a block diagram of a network environment 500 that depicts an example scenario for performing impact analysis in accordance with embodiments herein. Primary network 505 directly interfaces with customer network 510 and customer network 540. Customer network 510, in turn, is in communication—either directly or indirectly—with network 520, network 530, and network 540.

In general, impact analysis performed by the network correlator 150 (and manifested by the relational network mapping 190) can be useful to determine the business impact of discontinuing connectivity with a directly interfaced network (e.g., customer network 510 or any other customer or peer network not shown). Referring to the example configuration in FIG. 5, primary network 505 can reach (or is in indirect communication with) network 520, network 530 and network 540 via customer network 510. However, since primary network 505 only has connectivity with network 520 and network 530 via customer network 510, the primary network would lose connectivity to network 520 and network 530 if connectivity with customer network 510 were to be discontinued. Nonetheless, since primary network 505 is already communicably coupled (even if indirectly) with network 540, primary network 505 would not lose connectivity with network 540 if it were to discontinue connectivity with customer network 510.

In one example embodiment, the network correlator 150 (as manifested by the relational network mapping 190) can provide such an impact analysis by determining which AS numbers (and thus which networks) are reachable via customer network 510. The network correlator 150 could then compare these AS numbers with a set of all AS numbers reachable by the primary network 505 that do not connect through customer network 510. Then, those AS numbers that do not overlap in the compared groups of AS numbers would represent networks that are only reachable through customer network 510. In other words, primary network 505 would lose connectivity with those AS numbers that do not overlap (and that are only reachable through customer network 510) if the primary network 505 would discontinue/terminate/etc. connectivity with customer network 510. As a result, business decisions can be encouraged or dissuaded depending on the overall impact of discontinuing connectivity with a particular customer or peer network.

Note that the network correlator 150 can use other techniques and/or parameters for performing an impact analysis and that the embodiment(s) of FIG. 5 have been described for purposes of example only.

Further, and in accordance with the present embodiments, the relational network mapping 190 can be selectively configured to process and display results of an impact analysis on a graphical user interface. For example, the relational network mapping 190 can provide (and display upon a graphical user interface) an impact analysis related to disconnecting a directly interfaced network and any resultant networks (or AS numbers) that would become unreachable by the primary network 505 as a result. Similarly, in addition to, or in lieu of, the relational network mapping 190, information provided by one or more of the network traffic data set 260, traffic measurement data set 270, and/or mapping of network connectivity 280 can be utilized to perform an impact analysis as described above.

Figure 6:
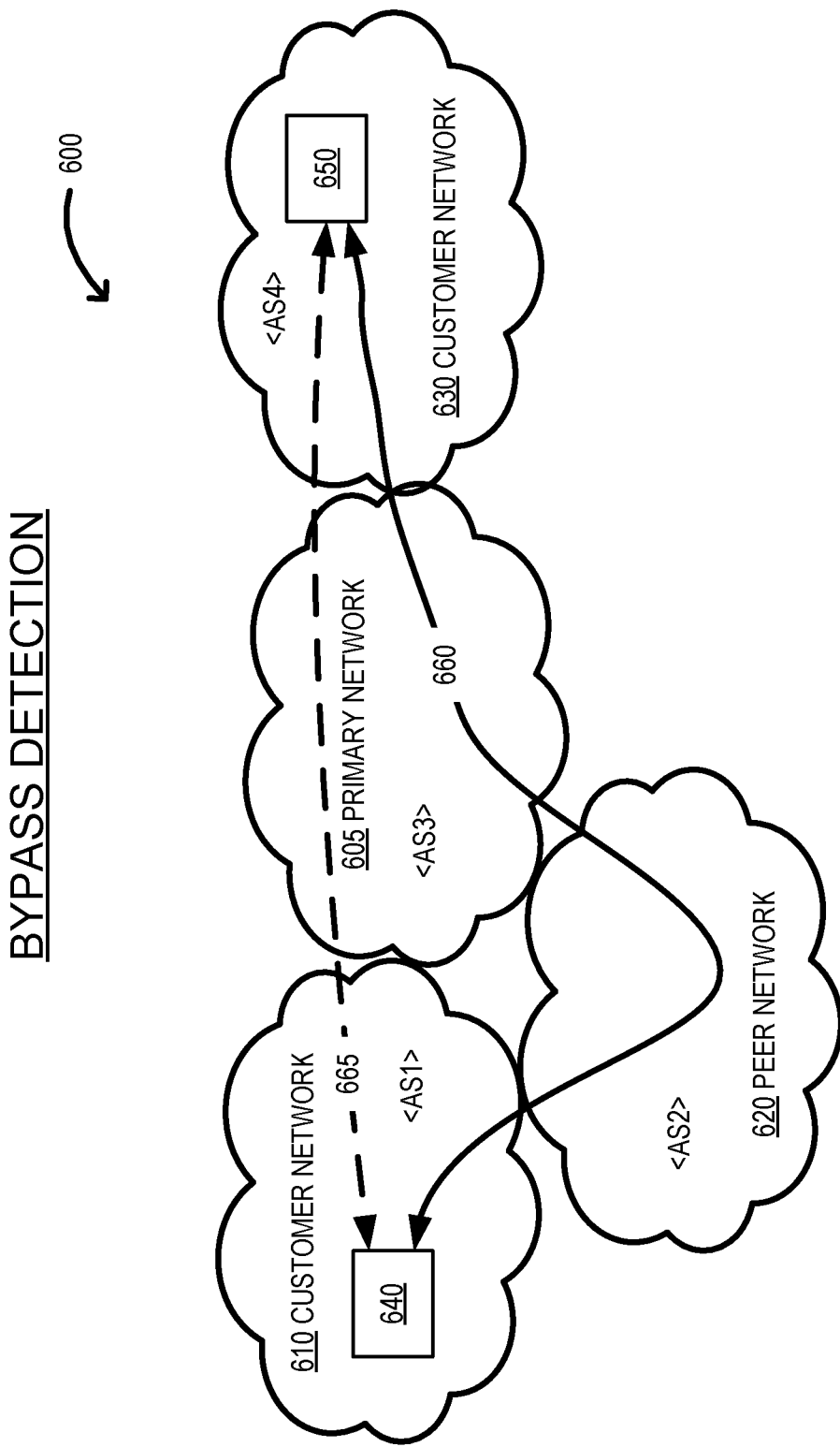
FIG. 6 is a block diagram of a network environment for performing bypass analysis in accordance with an example embodiment.

FIG. 6 is a block diagram of a network environment 600 that depicts an example scenario for performing bypass detection in accordance with embodiments herein. Primary network 605 directly interfaces with customer network 610 (having AS number AS1), peer network 620 (having AS number AS2), and customer network 630 (having AS number AS3). In this example embodiment, router 640 in customer network 610 transceives network traffic with router 650 in customer network 630 (as indicated by traffic traversal line 660). It should be noted that the network traffic does not flow directly from customer network 610 to primary network 605 and, instead, flows indirectly through peer network 620. In other words, peer network 620 is an intermediary network between primary network 605 and customer network 610 (at least for some network traffic, i.e., as indicated by traffic traversal line 660), even though primary network 605 directly interfaces with customer network 610. Further note that, generally, traffic originates/terminates from/at other end-user devices (not shown) and does not originate/terminate from/at routers 640 and 650.

In general, bypass detection performed by the network correlator 150 (and manifested by relational network mapping 190) can be useful to determine potential unrealized business opportunities with respect to the operation of the primary network 605. Referring to the example configuration in FIG. 6, since the customer network 610 does not necessarily have to transceive network traffic with the peer network 620 in order to reach customer network 630, proprietors/operators/etc. of the primary network 605 can solicit business (a new or additional connectivity relationship) directly from the customer network 610. This is advantageous for the proprietors/operators/etc. of the primary network 605 since they do not generate any revenue (or negligible revenue) in a traditional peering relationship—such is the case in the example embodiment of FIG. 6 where primary network 605 does not receive any revenue (at least from customer network 610) for transceiving network traffic 660 since primary network 605 interfaces with peer network 620 (instead of customer network 610) for at least the purposes of performing transmission of network traffic 660. Thus, by directly connecting with the customer network 610 with respect to network traffic 660 and, consequently, bypassing connectivity via peer network 620, the primary network 605 is capable of generating additional revenue and realizing previously undetected business opportunities. This direct connectivity relationship is exemplified by traffic traversal line 665 in FIG. 6—note that peer network 620 is no longer a part of the network traffic traversal path 665 between primary network 605 and customer network 610.

According to an example embodiment, the network correlator 150 can use the mapping of network connectivity 280 to compare an origin AS (or destination AS) of a network transmission, such as network traffic 660, with ingress or egress AS numbers already associated with the primary network 605 and its directly interfaced networks. If it determined that the origin AS (or destination AS) of the network transmission is the same as an ingress or egress AS associated with the primary network 605, and that there is one or more AS numbers in the AS path between the origin or destination AS and the primary network, then the network correlator 150 has detected a potential bypass opportunity, i.e., by bypassing the one or more AS numbers in the AS path between the origin or destination AS and the primary network.

Note that the network correlator 150 can use other techniques and/or parameters for performing bypass detection and that the embodiment(s) of FIG. 5 have been described for purposes of example only.

Further, and in accordance with the present embodiments, the relational network mapping 190 can be selectively configured to process and display results of a bypass detection analysis on a graphical user interface. For example, the relational network mapping 190 can provide information related to a directly interfaced customer network that transceives at least some of its network traffic indirectly through another (typically peer) network that is also directly interfaced with the primary network 605. In this example, the graphical display would show the potential new customer network as well as the potential peer network that the primary network 605 could bypass.

Figure 7:
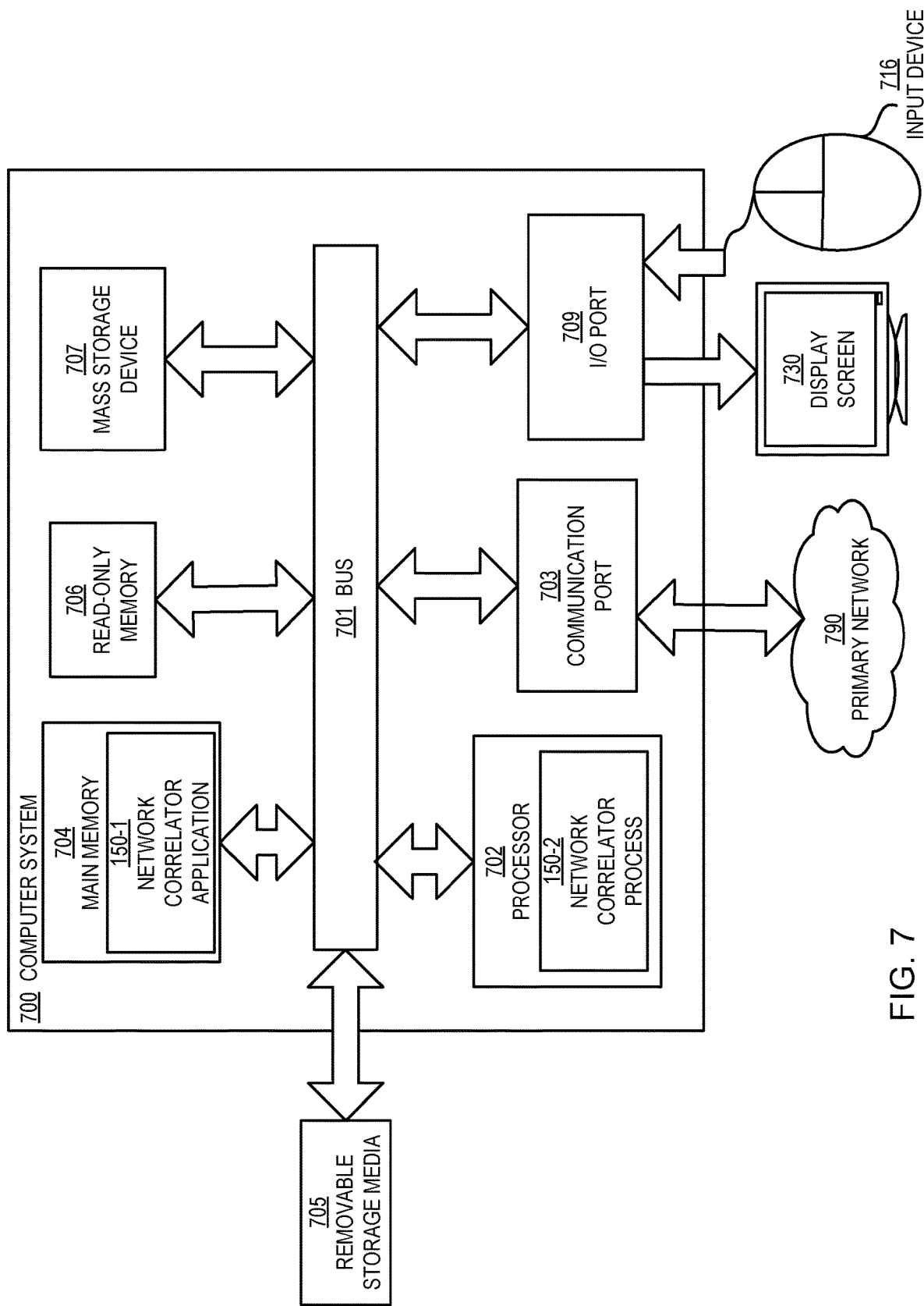
FIG. 7 is a block diagram of a computer system suitable for performing network monitoring and data correlation in accordance with an example embodiment.

FIG. 7 is a schematic diagram of a computer system 700 upon which embodiments of the present invention may be carried out and implemented. For example, one or more computing devices 700 (e.g., servers, routers, gateways, etc.) may be used to monitor and correlate network traffic data and statistics for a primary network (e.g., primary network 790) and related secondary networks.

According to the present example, the computer system 700 includes a bus 701 (i.e., interconnect), at least one processor 702, at least one communications port 703, a main memory 704, a removable storage media 705, a read-only memory 706, and a mass storage 707. Processor(s) 702 can be any known processor, such as, but not limited to, an Intel® Itanium® or Itanium 2® processor(s), AMD® Opteron® or Athlon MP® processor(s), or Motorola® lines of processors. Communications ports 703 can be any of an RS-232 port for use with a modem based dial-up connection, a 10/100 Ethernet port, a Gigabit port using copper or fiber, or a USB port. Communications port(s) 703 may be chosen depending on a network such as a Local Area Network (LAN), a Wide Area Network (WAN), or any network to which the computer system 700 connects (e.g., primary network 790). The computer system 700 may be in communication with peripheral devices (e.g., display screen 730, input device 716) via Input/Output (I/O) port 709.

Main memory 704 can be Random Access Memory (RAM), or any other dynamic storage device(s) commonly known in the art. Read-only memory 706 can be any static storage device(s) such as Programmable Read-Only Memory (PROM) chips for storing static information such as instructions for processor 702. Mass storage 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 701 communicatively couples processor(s) 702 with the other memory, storage and communications blocks. Bus 701 can be a PCI/PCI-X, SCSI, or Universal Serial Bus (USB) based system bus (or other) depending on the storage devices used. Removable storage media 705 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions, which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 is encoded with network correlator application 150-1 that supports functionality as discussed above and as discussed further below. Network correlator application 150-1 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 702 accesses main memory 704 via the use of bus 701 in order to launch, run, execute, interpret or otherwise perform the logic instructions of the network correlator application 150-1. Execution of network correlator application 150-1 produces processing functionality in network correlator process 150-2. In other words, the network correlator process 150-2 represents one or more portions of the network correlator application 150-1 performing within or upon the processor(s) 702 in the computer system 700.

It should be noted that, in addition to the network correlator process 150-2 that carries out method operations as discussed herein, other embodiments herein include the network correlator application 150-1 itself (i.e., the unexecuted or non-performing logic instructions and/or data). The network correlator application 150-1 may be stored on a computer readable medium (e.g., a repository) such as a floppy disk, hard disk or in an optical medium. According to other embodiments, the network correlator application 150-1 can also be stored in a memory type system such as in firmware, read only memory (ROM), or, as in this example, as executable code within the main memory 704 (e.g., within Random Access Memory or RAM). For example, network correlator application 150-1 may also be stored in removable storage media 705, read-only memory 706, and/or mass storage device 707.

In addition to these embodiments, it should also be noted that other embodiments herein include the execution of the network correlator application 150-1 in processor(s) 702 as the network correlator process 150-2. Thus, those skilled in the art will understand that the computer system 700 can include other processes and/or software and hardware components, such as an operating system that controls allocation and use of hardware resources, or such as instances of the network flow collector module 160, the traffic measurement aggregator module 170 and/or the network mapping enrichment module 180. As such, the network correlator 150 (application 150-1 and process 150-2), network flow collector module 160 (application 160-1 and process 160-2), traffic measurement aggregator module 170 (application 170-1 and process 170-2), and network mapping enrichment module 180 (application 180-1 and process 180-2) may be implemented on the same computerized device 700 (e.g., router, server, etc.) as the same or separately executed processes, or on separate devices in various combinations as the same or separately executed processes.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

FIGS. 8-14 include flowcharts according to embodiments herein. The rectangular elements are herein denoted as "steps" and represent computer software instructions or groups of instructions that carry out such functions. The flow diagrams do not necessarily depict the syntax of any particular programming language. Rather, the flow diagrams illustrate the functional information one of ordinary skill in the art could use to fabricate circuits or to generate computer software (or a hybrid of both circuits and software code) to carry out the features as described herein.

It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 8:
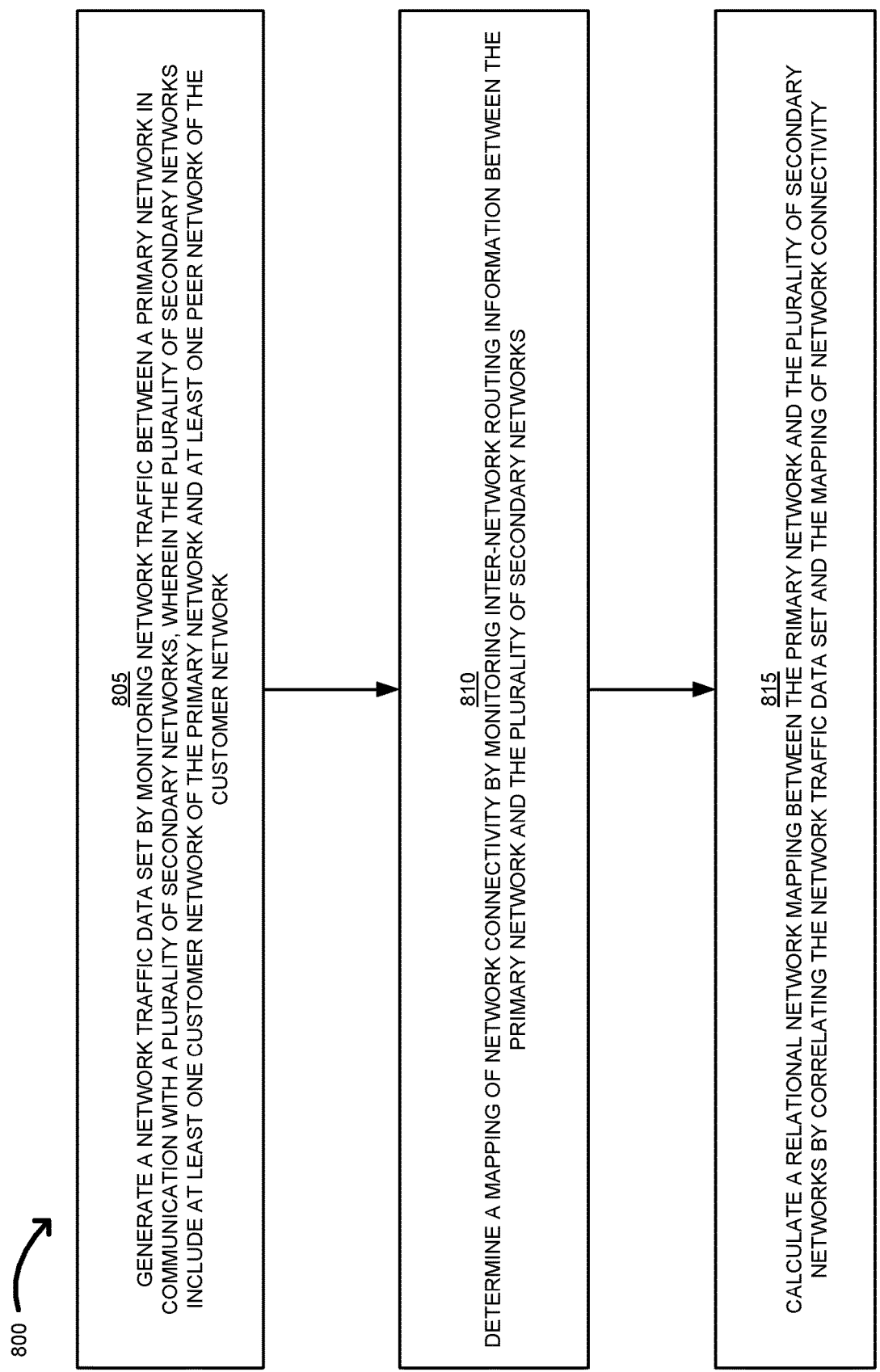
FIG. 8 is a flow chart that shows processing operations performed by a network correlator in accordance with an example embodiment.

Now, more specifically, FIG. 8 is a flow chart 800 of processing steps that shows processing operations performed by the network correlator 150 (i.e., network correlator application 150-1 and/or the run-time implementation of network correlator process 150-2) in accordance with one example embodiment.

In step 805, the network correlator 150 generates a network traffic data set by monitoring network traffic between a primary network and a plurality of secondary networks. In one example embodiment, the plurality of secondary networks include at least one customer network of the primary network and at least one peer network of the primary network.

In step 810, the network correlator 150 determines a mapping of network connectivity by monitoring inter-network routing information between the primary network and the plurality of secondary networks. The mapping of network connectivity can include, for example, BGP data such as AS paths and egress AS numbers.

In step 815, the network correlator 150 calculates a relational network mapping between the primary network and the plurality of secondary networks by correlating the network traffic data set and (or with) the mapping of network connectivity.

Figure 9:
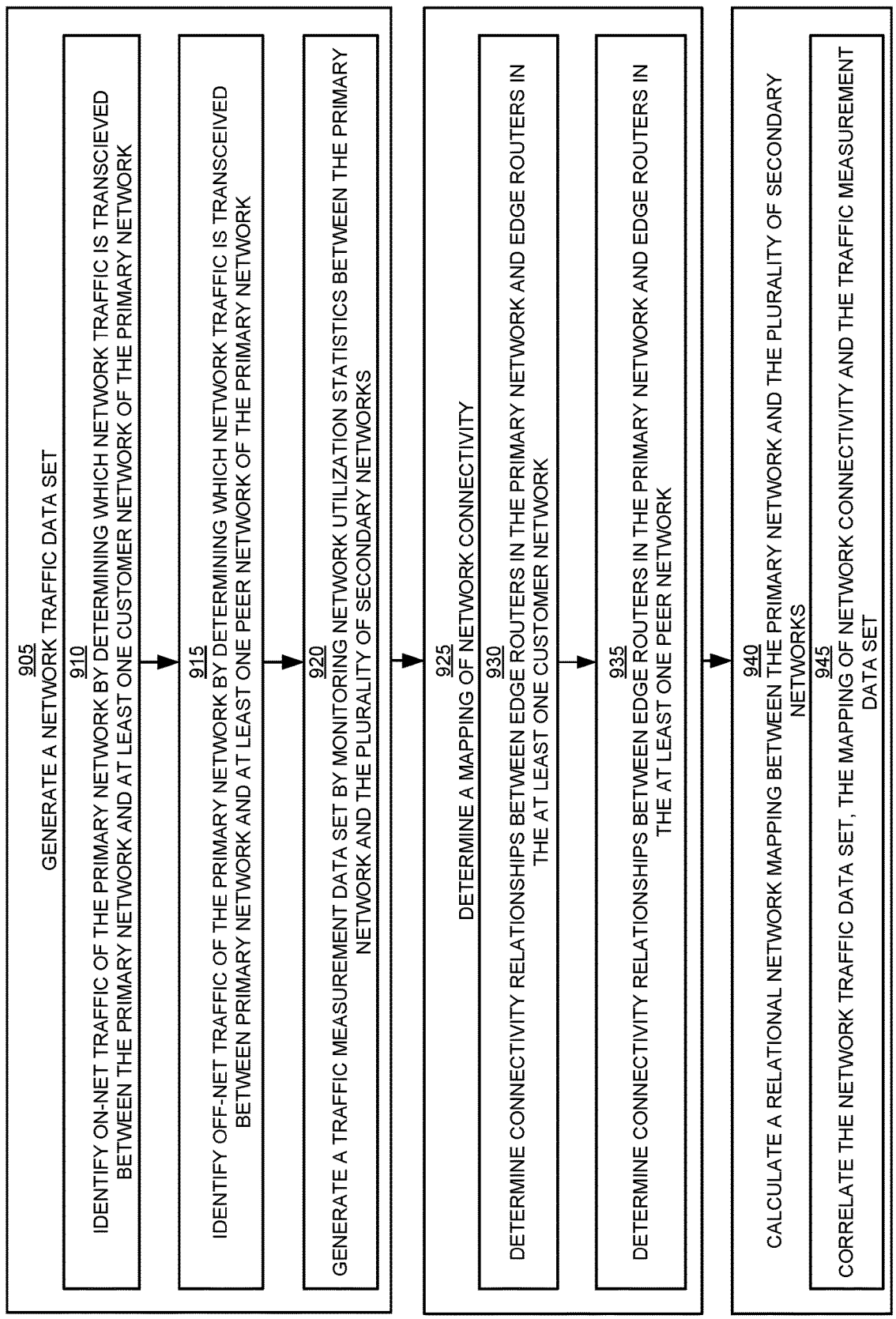
FIG. 9 is a flow chart that shows processing operations performed by a network correlator in accordance with an example embodiment.

FIG. 9 is a flow chart 900 of processing steps that shows processing operations performed by the network correlator 150 in accordance with one example embodiment.

In step 905, the network correlator 150 generates a network traffic data set. The network traffic data set can include, for example, origin AS number, destination AS number, origin IP address, destination IP address, ingress AS number, etc.

In step 910, the network correlator 150 identifies on-net traffic of the primary network by determining which network traffic is transceived between the primary network and at least one customer network of the primary network. In other words, on-net traffic is typically defined as traffic that remains exclusively on the primary network or a customer network.

In step 915, the network correlator 150 identifies off-net traffic of the primary network by determining which network traffic is transceived between primary network and at least one peer network of the primary network. In other words, off-net traffic is typically defined as traffic that ingresses or egresses to a peer network.

According to an example embodiment, the network correlator 150 collects network traffic data in accordance with a sampling rate (e.g., network traffic transceived during a given 5 minute interval). The network correlator 150 can then identify on-net or off-net traffic of the primary network by determining, for each sampled transmission of network traffic, at least one of an originating Autonomous System Number (ASN), a destination ASN, an ingress ASN, and/or an egress ASN.

In step 920, the network correlator 150 generates a measurement data set by monitoring network utilization statistics between the primary network and the plurality of secondary networks.

In one example embodiment, the network correlator 150 monitors network utilization statistics to determine an amount (or rate) of network traffic that is transceived between the primary network and at least one customer network. Similarly, the network correlator 150 can monitor network utilization statistics to determine an amount of network traffic that is transceived between the primary network and at least one peer network. For example, monitoring network utilization statistics can include aggregating sampled network data from one or more Simple Network Management Protocol (SNMP) counters that are distributed throughout the network at various network nodes (i.e., routers, gateways, etc.). Generally, the SNMP counters monitor and normalize network traffic transceived at a particular ingress or egress interface in the primary network.

In step 925, the network correlator 150 determines a mapping of network connectivity (e.g., BGP tables and associated data).

In step 930, the network correlator 150 determines connectivity relationships between edge routers in the primary network and edge routers in the at least one customer network. For example, the network correlator 150 can monitor advertised routing tables (via BGP) provided by an edge router in a customer network and supplied to an egress router in the primary network.

In step 935, the network correlator 150 determines connectivity relationships between edge routers in the primary network and edge routers in the at least one peer network. Similar to the example above, the network correlator 150 can determine advertised routing tables (via BGP) provided by an edge router in a peer network and supplied to an egress router in the primary network.

In step 940, the network correlator 150 calculates a relational network mapping 190 between the primary network and the plurality of secondary networks.

In step 945, the network correlator 150 correlates the network traffic data set, the mapping of network connectivity and the traffic measurement data set. For example, the network data set and traffic measurement data set may be correlated first to yield an aggregate and/or normalized network data set. In this example, the aggregate and/or normalized network data set would then be correlated with the mapping of network connectivity to yield the relational network mapping 190.

Figure 10:
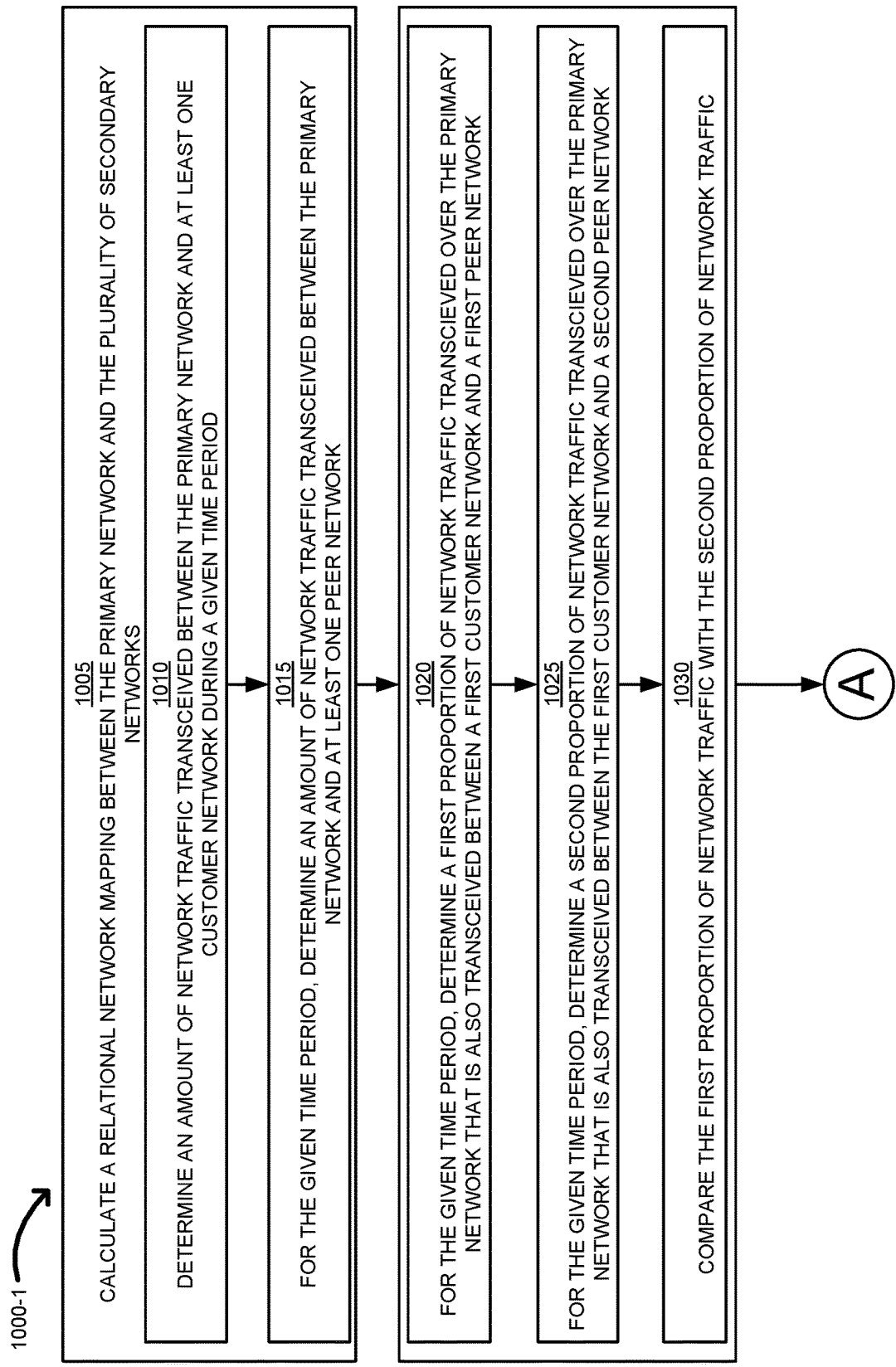
FIGS. 10 and 11 are flow charts that show processing operations performed by a network correlator in accordance with an example embodiment.
Figure 11:
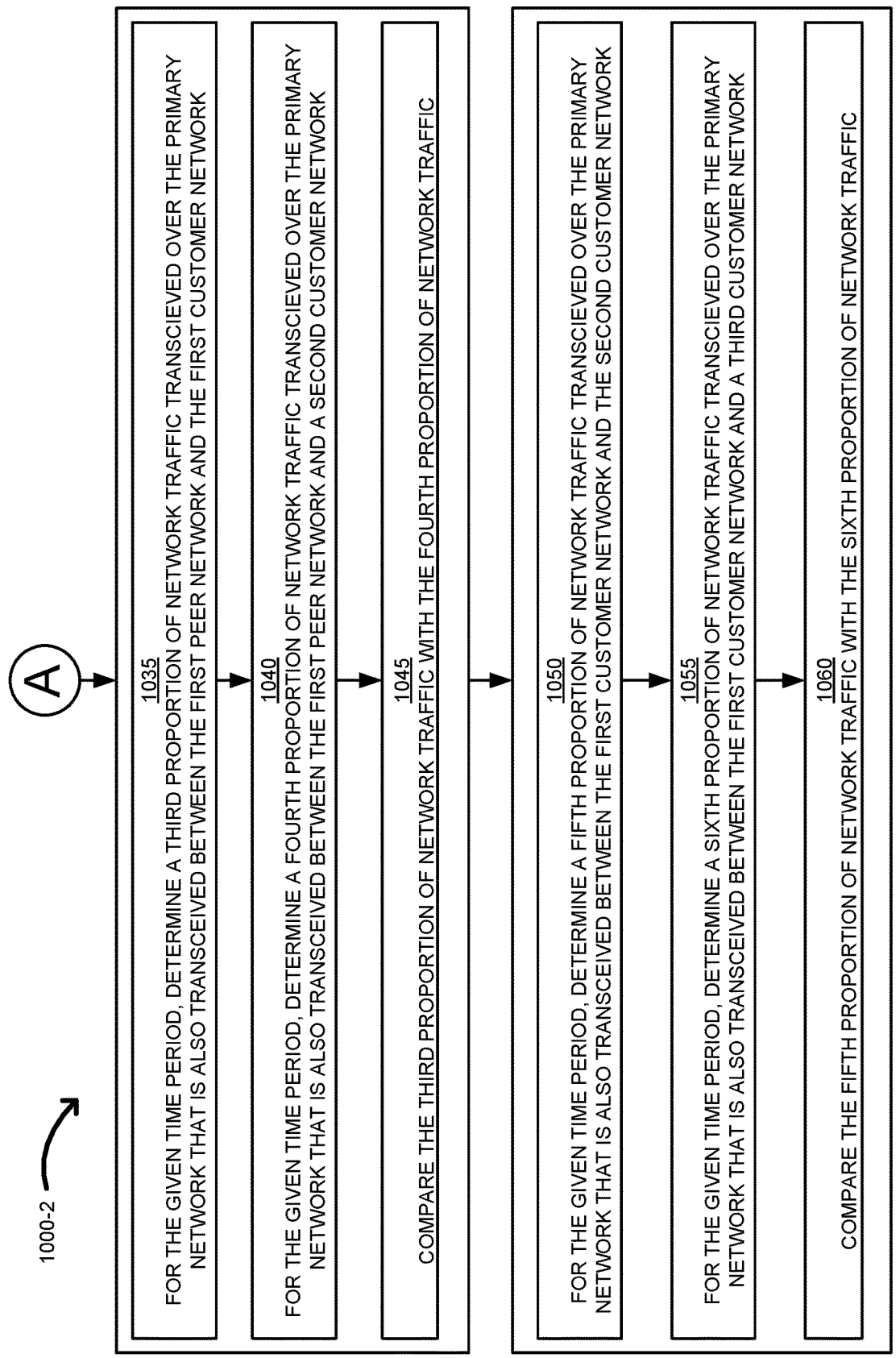

FIGS. 10 and 11 are flow charts 1000-1 and 1000-2, respectively, depicting processing steps that show processing operations performed by the network correlator 150 in accordance with one example embodiment.

In step 1005, the network correlator 150 calculates a relational network mapping 190 between the primary network and the plurality of secondary networks.

In step 1010, the network correlator 150 determines an amount of network traffic transceived between the primary network and at least one customer network during a given time period.

In step 1015, the network correlator 150, for the given time period, determines an amount of network traffic transceived between the primary network and at least one peer network.

In step 1020, the network correlator 150, for the given time period, determines a first proportion of network traffic transceived over the primary network that is also transceived between the first customer network and the first peer network.

In step 1025, the network correlator 150, for the given time period, determines a second proportion of network traffic transceived over the primary network that is also transceived between the first customer network and the second peer network.

In step 1030, the network correlator 150 compares the first proportion of network traffic with the second proportion of network traffic. For example, the first proportion of network traffic can be compared graphically with the second proportion of network traffic in a graphical user interface (e.g., via pie charts, line graphs, etc.).

In step 1035, the network correlator 150, for the given time period, determines a third proportion of network traffic transceived over the primary network that is also transceived between the first peer network and the first customer network.

In step 1040, the network correlator 150, for the given time period, determines a fourth proportion of network traffic transceived over the primary network that is also transceived between the first peer network and a second customer network In step 1045, the network correlator 150 compares the third proportion of network traffic with the fourth proportion of network traffic. For example, the third proportion of network traffic can be compared graphically with the fourth proportion of network traffic in a graphical user interface (e.g., via pie charts, line graphs, etc.).

In step 1050, the network correlator 150, for the given time period, determines a fifth proportion of network traffic transceived over the primary network that is also transceived between the first customer network and the second customer network.

In step 1055, the network correlator 150, for the given time period, determines a sixth proportion of network traffic transceived over the primary network that is also transceived between the first customer network and a third customer network.

In step 1060, the network correlator 150 compares the fifth proportion of network traffic with the sixth proportion of network traffic. For example, the fifth proportion of network traffic can be compared graphically with the sixth proportion of network traffic in a graphical user interface (e.g., via pie charts, line graphs, etc.).

Figure 12:
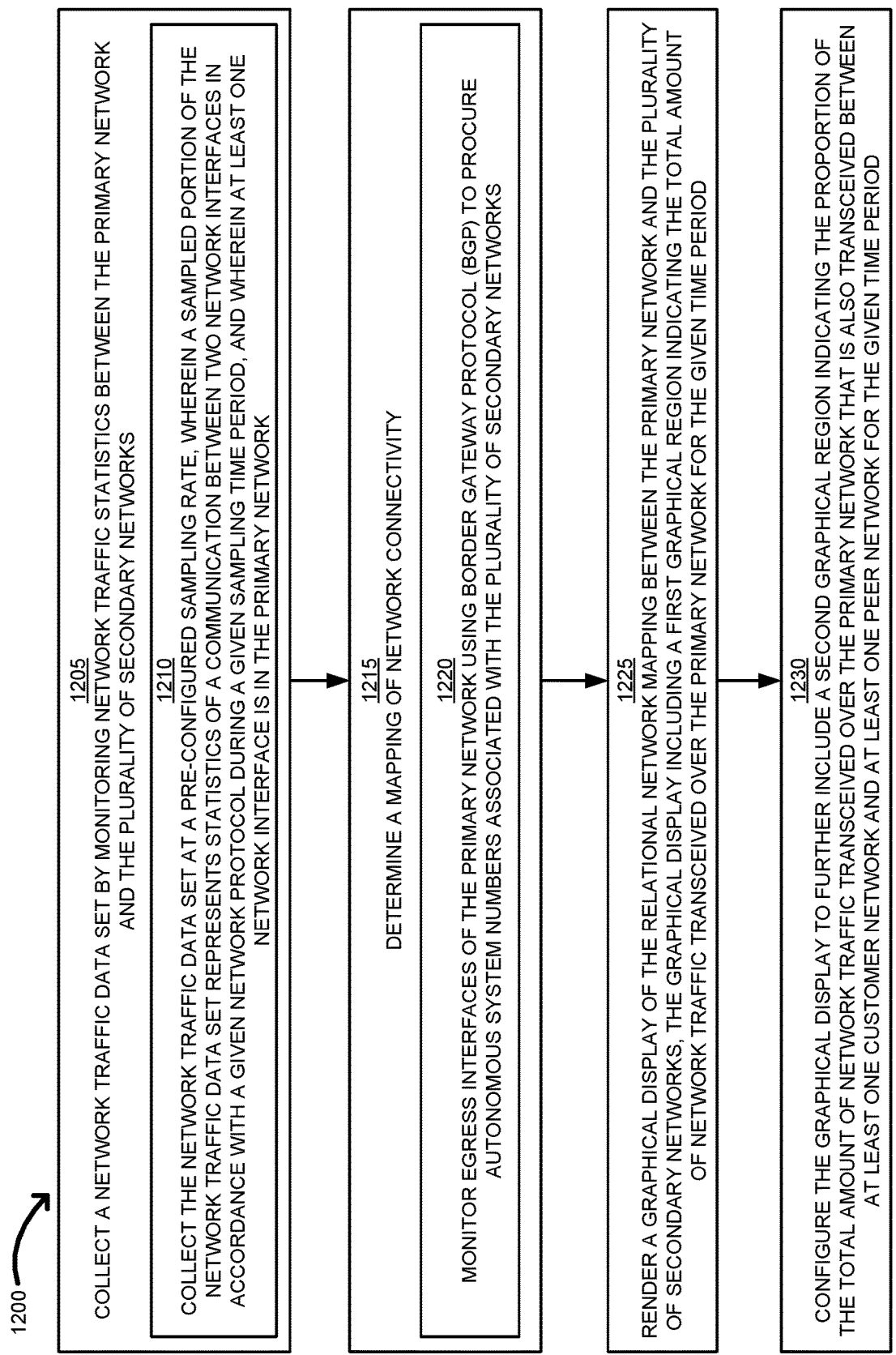
FIG. 12 is a flow chart that shows processing operations performed by a network correlator in accordance with an example embodiment.

FIG. 12 is a flow chart 1200 of processing steps that shows processing operations performed by the network correlator 150 in accordance with one example embodiment.

In step 1205, the network correlator 150 collects a network traffic data set by monitoring network traffic statistics between the primary network and the plurality of secondary networks.

In step 1210, the network correlator 150 collects the network traffic data set at a pre-configured sampling rate, wherein a sampled portion of the network traffic data set represents statistics of a communication between two network interfaces in accordance with a given network protocol during a given sampling time period, and wherein at least one network interface is in the primary network.

In step 1215, the network correlator 150 determines a mapping of network connectivity.

In step 1220, the network correlator 150 monitors egress interfaces of the primary network using Border Gateway Protocol (BGP) to procure Autonomous System Numbers (ASNs) associated with the plurality of secondary networks.

In step 1225, the network correlator 150 renders a graphical display (e.g., in a graphical user interface) of the relational network mapping between the primary network and the plurality of secondary networks, the graphical display including a first graphical region indicating a total amount of network traffic transceived over the primary network for the given time period.

In step 1230, the network correlator 150 configures the graphical display to further include a second graphical region indicating a proportion of the total amount of network traffic transceived over the primary network that is also transceived between at least one customer network and at least one peer network for the given time period.

According to another example embodiment, the network correlator 150 renders a graphical display (e.g., in a graphical user interface) of the relational network mapping 190 between the primary network and the plurality of secondary networks. In this manner, the graphical display includes a first graphical region indicating an amount of network traffic transceived between the primary network and a first customer network for a given time period. Note that the graphical display can further include a second graphical region indicating an amount of network traffic transceived over the primary network that is also transceived between the first customer network and a first peer network for the given time period.

Further yet, the graphical display can include a third graphical region indicating an amount of network traffic transceived over the primary network that is also transceived between the first customer network and a second customer network for the given time period. Similarly, the graphical display can additionally include a third graphical region indicating an amount of network traffic transceived over the primary network that is also transceived between the first customer network and a second peer network for the given time period.

It should be noted that the graphical display can include multiple graphical regions depending on how many customer and peer networks with which a selected secondary network transceives data.

In another example embodiment, the network correlator 150 renders a graphical display (e.g., in a graphical user interface) of the relational network mapping 190 between the primary network and the plurality of secondary networks. In this manner, the graphical display can include a first graphical region indicating an amount of network traffic transceived between the primary network and a first peer network for the given time period. The graphical display can further include a second graphical region indicating an amount of network traffic transceived over the primary network that is also transceived between the first peer network and a first customer network for the given time period. In such an embodiment, the graphical display can further yet include a third graphical region indicating an amount of network traffic transceived over the primary network that is also transceived between the first peer network and a second customer network for the given time period.

Again, the graphical display can include multiple graphical regions depending on how many customer and peer networks with which a selected secondary network transceives data.

Figure 13:
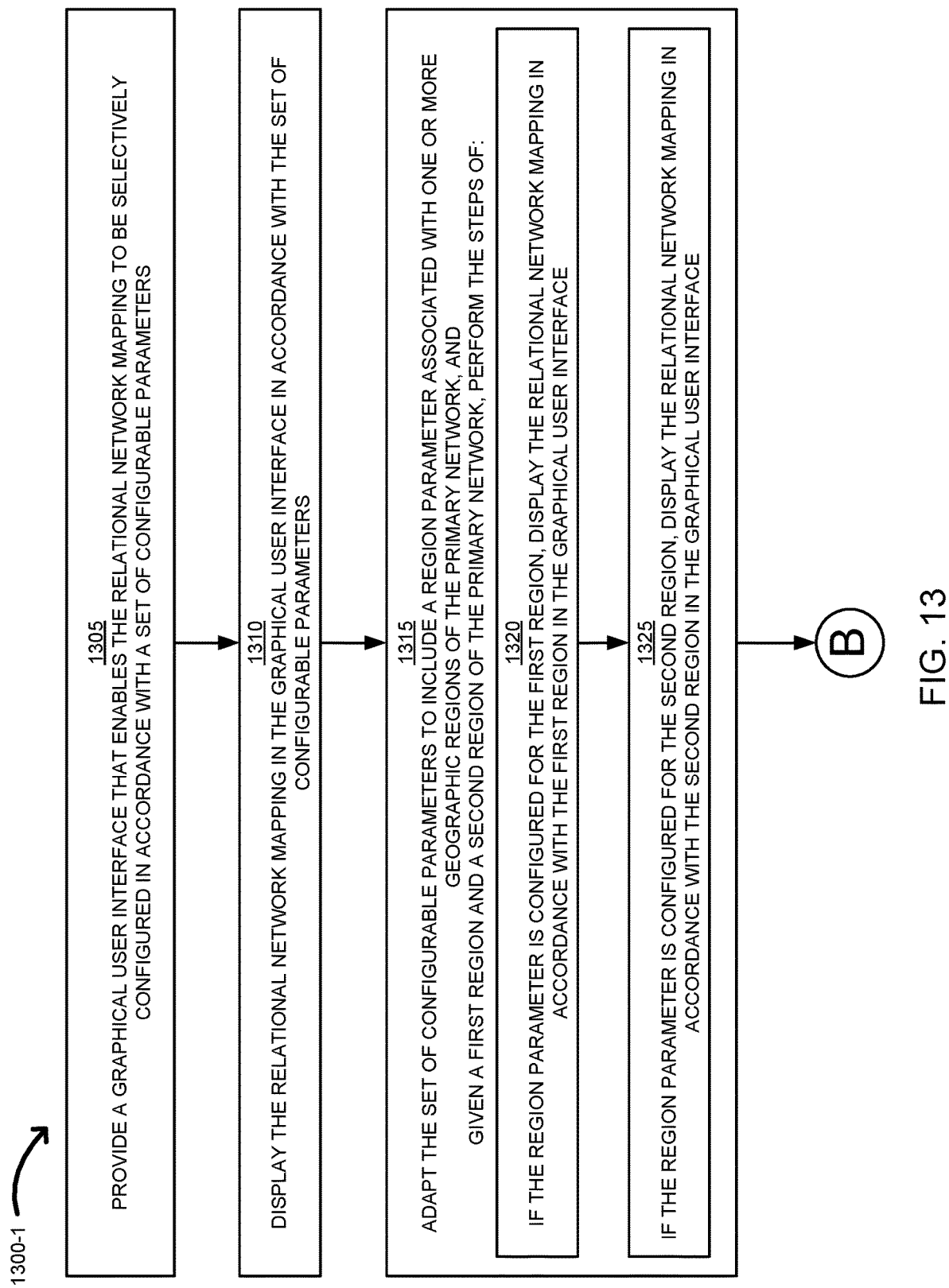
FIGS. 13 and 14 are flow charts that show processing operations performed by a network correlator in accordance with an example embodiment.
Figure 14:
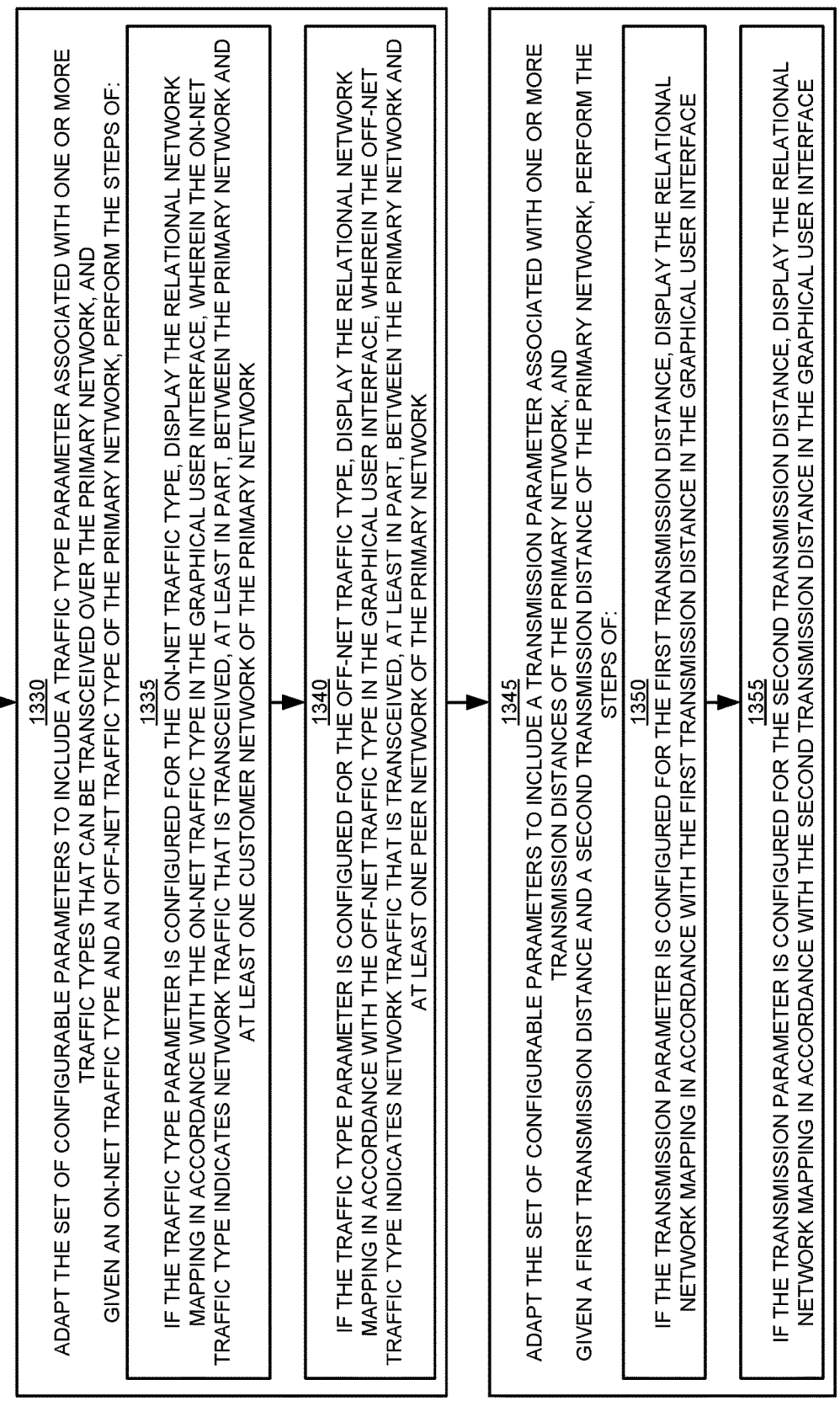

FIGS. 13 and 14 are flow charts 1300-1 and 1300-2, respectively, depicting processing steps that show processing operations performed by the network correlator 150 in accordance with one example embodiment.

In step 1305, the network correlator 150 provides a graphical user interface that enables the relational network mapping 190 to be selectively configured in accordance with a set of configurable parameters.

In step 1310, the network correlator 150 displays the relational network mapping 190 in the graphical user interface in accordance with the set of configurable parameters. The set of configurable parameters can include, but are not limited to, a region parameter (e.g., United States, Europe, West Coast, etc.), a traffic type parameter (e.g., on-net, off-net, etc.), a transmission parameter (e.g., backbone, long-haul, local, etc.), or any other parameter suitable for providing analysis of network traffic behavior.

In step 1315, the network correlator 150 adapts the set of configurable parameters to include a region parameter associated with one or more geographic regions of the primary network. Given a first region and a second region of the primary network, the network correlator 150 performs step 1320 and/or step 1325 described below.

In step 1320, if the region parameter is configured for the first region, the network correlator 150 displays the relational network mapping in accordance with the first region in the graphical user interface.

In step 1325, if the region parameter is configured for the second region, the network correlator 150 displays the relational network mapping in accordance with the second region in the graphical user interface.

In step 1330, the network correlator 150 adapts the set of configurable parameters to include a traffic type parameter associated with one or more traffic types that can be transceived over the primary network. Given an on-net traffic type and an off-net traffic type of the primary network, the network correlator 150 performs step 1335 and/or step 1340 described below.

In step 1335, if the traffic type parameter is configured for the on-net traffic type, the network correlator 150 displays the relational network mapping in accordance with the on-net traffic type in the graphical user interface, wherein the on-net traffic type indicates network traffic that is transceived, at least in part, between the primary network and at least one customer network of the primary network.

In step 1340, if the traffic type parameter is configured for the off-net traffic type, the network correlator 150 displays the relational network mapping in accordance with the off-net traffic type in the graphical user interface, wherein the off-net traffic type indicates network traffic that is transceived, at least in part, between the primary network and at least one peer network of the primary network.

In step 1345, the network correlator 150 adapts the set of configurable parameters to include a transmission parameter associated with one or more transmission distances of the primary network. Given a first transmission distance and a second transmission distance of the primary network, the network correlator 150 performs step 950 and/or step 955 described below.

In step 1350, if the transmission parameter is configured for the first transmission distance, the network correlator 150 displays the relational network mapping in accordance with the first transmission distance in the graphical user interface.

In step 1355, if the region parameter is configured for the second transmission distance, the network correlator 150 displays the relational network mapping in accordance with the second transmission distance in the graphical user interface.

In accordance with an example embodiment, the network correlator 150 displays the relational network mapping by enabling the graphical user interface to be configured according to a region parameter, a traffic type parameter, and a transmission parameter. For example, the region parameter can be selectively configurable to a first and a second region associated with the primary network.

Similarly, the traffic type parameter can be selectively configurable to an on-net traffic type and an off-net traffic type. In this manner, the on-net traffic type is associated with network traffic transceived between the primary network and at least one customer network, while the off-net traffic type is associated with network traffic transceived between the primary network and at least one peer network.

In another example embodiment, the transmission parameter is selectively configurable to a local transmission distance and a backbone transmission distance.

Although the present invention has been described with reference to various embodiments, it will be understood that the invention is not limited to the details thereof. Various modifications and substitutions will occur to those of ordinary skill in the art. All such substitutions are intended to be embraced within the scope of the invention as defined in the appended claims.

What is claimed is:

1. A system comprising:
a primary network comprising a plurality of network devices selected from a group consisting of: switches, routers, servers, and gateways; wherein the primary network is connected to a plurality of secondary networks, and wherein the secondary networks comprise both customer networks and peer networks; and
a network correlator module stored as instructions in memory and executable by one or more of said network devices, the network correlator module configured to
perform bypass detection analysis of the secondary networks by determining which customer networks directly connected to the primary network indirectly transceive network traffic with the primary network via one or more peer networks;
identify a first set of origin or destination Autonomous System Numbers (ASNs) associated with customer network transmissions across the primary network; and
when at least one ASN of a peer network appears in a path between an ASN associated with the at least one customer network and an ASN associated with the primary network, identifying the at least one customer network as the bypass opportunity.

2. A system as recited in claim 1, wherein the network correlator module is further configured to:
identify a second set of ingress or egress ASNs associated with secondary networks directly connected to the primary network;
compare the first set with the second set; and
when an ASN in the first set and second set overlaps, identifying a bypass opportunity when the overlapping ASN has one or more other ASNs in the transmission path between the origin or destination ASN and the ASN of the primary network.

3. A system as recited in claim 2 further comprising:
a network flow module configured to generate a network traffic data set by monitoring network traffic between the primary network and the plurality of secondary networks;
a network connectivity module configured to determine a mapping of network connectivity by monitoring inter-network routing information between the primary network and the plurality of secondary networks; and
wherein the network correlator module is further configured to calculate a relational network mapping between the primary network and the plurality of secondary networks by correlating the network traffic data set and the mapping of network connectivity.

4. A system as recited in claim 3 further comprising:
a graphical user interface; and
wherein the network correlator module is further configured to render, in the graphical user interface, a graphical display of:
the relational network mapping between the primary network and the plurality of secondary networks; and
at least one of a customer network and a peer network associated with the identified bypass opportunity.

5. A system as recited in claim 1 further comprising:
a network flow module configured to generate a network traffic data set by monitoring network traffic between the primary network and the plurality of secondary networks;
a network connectivity module configured to determine a mapping of network connectivity by monitoring inter-network routing information between the primary network and the plurality of secondary networks; and
wherein the network correlator module is further configured to calculate a relational network mapping between the primary network and the plurality of secondary networks by correlating the network traffic data set and the mapping of network connectivity.

6. A system as recited in claim 1 further comprising:
a graphical user interface; and
wherein the network correlator module is further configured to render, in the graphical user interface, a graphical display of:
the relational network mapping between the primary network and the plurality of secondary networks; and
at least one of a customer network and a peer network associated with the identified bypass opportunity.

7. A method for performing bypass detection analysis in a primary network connected to a plurality of secondary networks, wherein the secondary networks comprise both customer networks and peer networks, the method comprising:
receiving, at a network correlator of the primary network, connectivity information regarding connections to at least one ingress device of the primary network and at least one egress device of the primary network;
aggregating the connectivity information;
using the aggregated connectivity information to determine at least one customer network directly connected to the primary network that indirectly transceives network traffic with the primary network via at least one peer network;
identifying the at least one customer network as a bypass opportunity, wherein identifying the at least one customer network as a bypass opportunity comprises identifying a first set of origin or destination Autonomous System Numbers (ASNs) associated with transmissions of the at least one customer network across the primary network; and when at least one ASN of a peer network appears in a path between an ASN associated with the at least one customer network and an ASN associated with the primary network, identifying the at least one customer network as the bypass opportunity; and
displaying the bypass opportunity in a user interface.

8. The method of claim 7, wherein displaying the bypass opportunity comprises displaying an identification of the at least one customer network and the at least one peer network.

9. A system for performing bypass detection analysis in a primary network connected to a plurality of secondary networks, wherein the secondary networks comprise both customer networks and peer networks, the system comprising:
at least one processor;
memory, operatively connected to the at least one processor and containing instructions that, when executed by the at least one processor, cause the system to perform a method, the method comprising:
receiving, at a network correlator of the primary network, connectivity information regarding connections to at least one ingress device of the primary network and at least one egress device of the primary network;

aggregating the connectivity information;

using the aggregated connectivity information to determine at least one customer network directly connected to the primary network that indirectly transceives network traffic with the primary network via at least one peer network;

identifying the at least one customer network as a bypass opportunity, wherein identifying the at least one customer network as a bypass opportunity comprises identifying a first set of origin or destination Autonomous System Numbers (ASNs) associated with transmissions of the at least one customer network across the primary network; and when at least one ASN of a peer network appears in a path between an ASN associated with the at least one customer network and an ASN associated with the primary network, identifying the at least one customer network as the bypass opportunity; and displaying the bypass opportunity in a user interface.

10. The system of claim 9, wherein displaying the bypass opportunity comprises displaying an identification of the at least one customer network and the at least one peer network.

\* \* \* \* \*